United States Patent
Ford et al.

(10) Patent No.: US 11,911,230 B2
(45) Date of Patent: Feb. 27, 2024

(54) DENTAL TREATMENT APPLIANCE

(71) Applicant: Dyson Technology Limited, Wiltshire (GB)

(72) Inventors: Matthew William Ford, Bristol (GB); Peter Joel Davies, Whitley (GB)

(73) Assignee: Dyson Technology Limited, Wiltshire (GB)

( * ) Notice: Subject to any disclaimer, the term of this patent is extended or adjusted under 35 U.S.C. 154(b) by 596 days.

(21) Appl. No.: 17/251,687

(22) PCT Filed: Apr. 23, 2019

(86) PCT No.: PCT/GB2019/051124
§ 371 (c)(1),
(2) Date: Dec. 11, 2020

(87) PCT Pub. No.: WO2019/243761
PCT Pub. Date: Dec. 26, 2019

(65) Prior Publication Data
US 2021/0274923 A1  Sep. 9, 2021

(30) Foreign Application Priority Data
Jun. 20, 2018 (GB) ................ 1810144

(51) Int. Cl.
*A61C 17/02* (2006.01)
*A46B 11/00* (2006.01)
(Continued)

(52) U.S. Cl.
CPC ...... *A61C 17/0202* (2013.01); *A46B 11/0037* (2013.01); *A46B 11/0062* (2013.01);
(Continued)

(58) Field of Classification Search
CPC ... A46B 11/002; A46B 11/0062; A61C 17/02; A61C 17/0202; A61C 17/22; A61C 17/227
See application file for complete search history.

(56) References Cited

U.S. PATENT DOCUMENTS 1,691,523 A   11/1928  Maycen
2,766,472 A   10/1956  Durrett
(Continued)

FOREIGN PATENT DOCUMENTS

CA   2762842 A1   11/2010
CN   2580827 Y    10/2003
(Continued)

OTHER PUBLICATIONS

Follows et al., U.S. Office Action dated Mar. 12, 2019, directed to U.S. Appl. No. 15/804,284; 9 pages.
(Continued)

*Primary Examiner* — Jennifer C Chiang
(74) *Attorney, Agent, or Firm* — Faegre Drinker Biddle & Reath LLP

(57) ABSTRACT

A dental cleaning appliance includes a handle, a fluid reservoir for storing a working fluid, and a fluid delivery system for receiving working fluid from the reservoir, and for delivering working fluid to the oral cavity of a user. The fluid reservoir includes a fluid port from which fluid is dispensed from the fluid reservoir, and through which the fluid reservoir is replenished. The fluid reservoir is moveable along the handle between a first position in which the fluid port is connected to the fluid delivery system, and a second position in which the fluid port is exposed to allow the fluid reservoir to be replenished.

17 Claims, 13 Drawing Sheets

(51) Int. Cl.
*A61C 17/22* (2006.01)
*A46B 5/00* (2006.01)
*A46B 9/04* (2006.01)

(52) U.S. Cl.
CPC ............ *A61C 17/02* (2013.01); *A61C 17/227* (2013.01); *A46B 5/0095* (2013.01); *A46B 9/04* (2013.01)

(56) References Cited

U.S. PATENT DOCUMENTS

| | | |
|---|---|---|
| 3,195,537 A | 7/1965 | Blasi |
| 3,235,897 A | 2/1966 | Fortenberry |
| 3,667,454 A | 6/1972 | Prince |
| 3,903,625 A | 9/1975 | Augustine |
| 4,315,741 A | 2/1982 | Reichl |
| 4,779,173 A | 10/1988 | Carr et al. |
| 4,845,796 A | 7/1989 | Mosley |
| 4,961,698 A | 10/1990 | Vlock |
| 4,978,297 A | 12/1990 | Vlock |
| 5,115,533 A | 5/1992 | Hukuba |
| 5,218,956 A | 6/1993 | Handler et al. |
| 5,339,479 A | 8/1994 | Lyman |
| 5,372,501 A | 12/1994 | Shalvi |
| 5,393,153 A | 2/1995 | Bouthillier et al. |
| 5,561,881 A | 10/1996 | Klinger et al. |
| 5,673,451 A | 10/1997 | Moore et al. |
| 5,704,087 A | 1/1998 | Strub |
| 5,784,742 A | 7/1998 | Giuliani et al. |
| 5,815,872 A | 10/1998 | Meginniss, III et al. |
| 5,876,207 A | 3/1999 | Sundius et al. |
| 5,918,995 A | 7/1999 | Puurunen |
| 6,026,828 A | 2/2000 | Altshuler |
| 6,029,304 A | 2/2000 | Hulke et al. |
| 6,047,429 A | 4/2000 | Wu |
| 6,155,824 A | 12/2000 | Kamen et al. |
| 6,164,967 A | 12/2000 | Sale et al. |
| 6,202,242 B1 | 3/2001 | Salmon et al. |
| 6,402,410 B1 | 6/2002 | Hall et al. |
| 6,536,979 B1 | 3/2003 | Kenny et al. |
| 6,599,126 B1 | 7/2003 | Sale et al. |
| 6,606,755 B1 | 8/2003 | Robinson et al. |
| 6,689,078 B1 | 2/2004 | Rehkemper et al. |
| 6,739,782 B1 | 5/2004 | Rehkemper et al. |
| 6,766,549 B2 | 7/2004 | Klupt |
| 7,080,980 B2 | 7/2006 | Klupt |
| 7,596,827 B1 | 10/2009 | Puneet |
| 7,896,567 B2 | 3/2011 | Burrowes |
| 8,287,203 B2 | 10/2012 | Gruber et al. |
| 8,430,590 B2 | 4/2013 | Boland et al. |
| 8,522,384 B2 | 9/2013 | Leung |
| 8,651,340 B2 | 2/2014 | Lelieveld et al. |
| 8,904,590 B2 | 12/2014 | Jungnickel |
| 9,144,298 B2 | 9/2015 | Fattori |
| 9,700,129 B2 | 7/2017 | Follows et al. |
| 9,743,749 B2 | 8/2017 | Follows et al. |
| 9,839,284 B2 | 12/2017 | Follows et al. |
| 11,109,950 B2 * | 9/2021 | Wood ................ A61C 17/0202 |
| 2002/0004817 A1 | 1/2002 | Pham et al. |
| 2002/0044817 A1 | 4/2002 | Hall et al. |
| 2002/0100134 A1 | 8/2002 | Dunn et al. |
| 2002/0129454 A1 | 9/2002 | Hilscher et al. |
| 2002/0133308 A1 | 9/2002 | Lundell et al. |
| 2002/0152565 A1 | 10/2002 | Klupt |
| 2003/0056307 A1 | 3/2003 | Tybinkowski et al. |
| 2003/0131427 A1 | 7/2003 | Hilscher et al. |
| 2003/0205492 A1 | 11/2003 | Ferber et al. |
| 2004/0060138 A1 | 4/2004 | Pfenniger et al. |
| 2004/0143920 A1 | 7/2004 | Nanda |
| 2005/0004498 A1 | 1/2005 | Klupt |
| 2005/0034256 A1 | 2/2005 | Kemp et al. |
| 2005/0050658 A1 | 3/2005 | Chan et al. |
| 2005/0104556 A1 | 5/2005 | Pfenniger et al. |
| 2005/0238412 A1 | 10/2005 | Jacobs et al. |
| 2005/0254992 A1 | 11/2005 | Jenkins et al. |
| 2005/0271997 A1 | 12/2005 | Mikami et al. |
| 2006/0037158 A1 | 2/2006 | Foley et al. |
| 2006/0130253 A1 | 6/2006 | Rycroft |
| 2006/0150419 A1 | 7/2006 | Gruber et al. |
| 2006/0292521 A1 | 12/2006 | Hegemann |
| 2007/0039109 A1 | 2/2007 | Nanda |
| 2007/0041779 A1 | 2/2007 | Kuo |
| 2007/0080240 A1 | 4/2007 | Schuetz |
| 2007/0094822 A1 | 5/2007 | Gatzemeyer et al. |
| 2007/0190509 A1 | 8/2007 | Kim |
| 2008/0008979 A1 | 1/2008 | Thomas et al. |
| 2008/0060148 A1 | 3/2008 | Pinyayev et al. |
| 2008/0109973 A1 | 5/2008 | Farrell et al. |
| 2008/0141476 A1 | 6/2008 | Gatzemeyer et al. |
| 2008/0196185 A1 | 8/2008 | Gatzemeyer et al. |
| 2008/0250591 A1 | 10/2008 | Nanda |
| 2008/0313829 A1 | 12/2008 | Dabrowski |
| 2009/0064429 A1 | 3/2009 | Hall et al. |
| 2009/0064430 A1 | 3/2009 | Jimenez et al. |
| 2009/0136285 A1 | 5/2009 | Hall et al. |
| 2009/0144919 A1 | 6/2009 | Nanda |
| 2009/0148808 A1 | 6/2009 | Alexander et al. |
| 2009/0183689 A1 | 7/2009 | Moore et al. |
| 2009/0291422 A1 | 11/2009 | Puurunen et al. |
| 2009/0305187 A1 | 12/2009 | Janssen et al. |
| 2009/0307859 A1 | 12/2009 | Mottram et al. |
| 2009/0313778 A1 | 12/2009 | Wong et al. |
| 2009/0320231 A1 | 12/2009 | Rosenzweig et al. |
| 2010/0223742 A1 | 9/2010 | Kang |
| 2010/0269276 A1 | 10/2010 | Faranda et al. |
| 2010/0281636 A1 | 11/2010 | Ortins et al. |
| 2010/0325822 A1 | 12/2010 | Hilscher et al. |
| 2010/0325828 A1 | 12/2010 | Braun et al. |
| 2011/0010876 A1 | 1/2011 | Iwahori et al. |
| 2011/0027749 A1 | 2/2011 | Syed |
| 2011/0056033 A1 | 3/2011 | Iwahori et al. |
| 2011/0146015 A1 | 6/2011 | Moskovich et al. |
| 2011/0146016 A1 | 6/2011 | Gatzemeyer et al. |
| 2011/0184427 A1 | 7/2011 | McClure |
| 2011/0225858 A1 | 9/2011 | Glassman et al. |
| 2011/0247158 A1 | 10/2011 | Jungnickel et al. |
| 2011/0275424 A1 | 11/2011 | Schmid et al. |
| 2011/0314677 A1 | 12/2011 | Meier et al. |
| 2012/0066848 A1 | 3/2012 | Klemm et al. |
| 2012/0110763 A1 | 5/2012 | Jungnickel et al. |
| 2012/0137454 A1 | 6/2012 | Huy et al. |
| 2012/0156641 A1 | 6/2012 | Wada et al. |
| 2012/0183926 A1 | 7/2012 | Shalev |
| 2012/0189976 A1 | 7/2012 | Mcdonough et al. |
| 2012/0266396 A1 | 10/2012 | Leung |
| 2013/0045457 A1 | 2/2013 | Chettiar |
| 2013/0122453 A1 | 5/2013 | Paxton et al. |
| 2013/0125327 A1 | 5/2013 | Schmid et al. |
| 2013/0174366 A1 | 7/2013 | Stebila et al. |
| 2013/0177863 A1 | 7/2013 | Shreve |
| 2013/0205528 A1 | 8/2013 | Jungnickel et al. |
| 2013/0311321 A1 | 11/2013 | Gatzemeyer et al. |
| 2014/0007361 A1 | 1/2014 | Nazaroff et al. |
| 2014/0033034 A1 | 1/2014 | Patel |
| 2014/0096332 A1 | 4/2014 | Kitagawa et al. |
| 2014/0123420 A1 | 5/2014 | Nanda |
| 2014/0134568 A1 | 5/2014 | Heinrich et al. |
| 2014/0259474 A1 | 9/2014 | Sokol et al. |
| 2014/0304932 A1 | 10/2014 | Patel |
| 2014/0315142 A1 | 10/2014 | Montgomery |
| 2014/0332028 A1 | 11/2014 | Tran |
| 2015/0013088 A1 | 1/2015 | Li |
| 2015/0044629 A1 | 2/2015 | Wang |
| 2015/0147717 A1 | 5/2015 | Taylor et al. |
| 2015/0230899 A1 | 8/2015 | Vetter et al. |
| 2015/0313353 A1 | 11/2015 | Schmalhurst et al. |
| 2015/0335144 A1 | 11/2015 | Patel |
| 2015/0335145 A1 | 11/2015 | Bloch et al. |
| 2015/0342337 A1 | 12/2015 | Bloch |
| 2016/0045020 A1 | 2/2016 | Belge-barnes |
| 2016/0081465 A1 | 3/2016 | Metter |
| 2016/0296003 A1 | 10/2016 | Beckerman et al. |
| 2016/0317267 A1 | 11/2016 | Meerbeek et al. |
| 2016/0324595 A1 | 11/2016 | Benning |

(56) References Cited

U.S. PATENT DOCUMENTS

| | | |
|---|---|---|
| 2016/0331114 A1 | 11/2016 | Follows et al. |
| 2016/0331115 A1 | 11/2016 | Follows et al. |
| 2016/0331116 A1 | 11/2016 | Follows et al. |
| 2016/0331497 A1* | 11/2016 | Follows .............. A61C 17/221 |
| 2016/0331498 A1 | 11/2016 | Follows et al. |
| 2016/0338807 A1 | 11/2016 | Bloch et al. |
| 2017/0042638 A1 | 2/2017 | Lee |
| 2017/0056142 A1 | 3/2017 | Baragona et al. |
| 2017/0079419 A1 | 3/2017 | Wu et al. |
| 2017/0318951 A1 | 11/2017 | Taghvai |
| 2018/0028296 A1 | 2/2018 | Lee |
| 2018/0055212 A1 | 3/2018 | Follows et al. |
| 2018/0078350 A1 | 3/2018 | Zachar et al. |
| 2018/0084898 A1 | 3/2018 | Vincent et al. |
| 2018/0085207 A1 | 3/2018 | Tweedie et al. |
| 2018/0110322 A1 | 4/2018 | Marsh et al. |
| 2018/0110601 A1 | 4/2018 | Mighall et al. |
| 2019/0082819 A1 | 3/2019 | Katano et al. |
| 2021/0113314 A1 | 4/2021 | Ford et al. |
| 2021/0275283 A1 | 9/2021 | Davies et al. |

FOREIGN PATENT DOCUMENTS

| | | |
|---|---|---|
| CN | 2832460 Y | 11/2006 |
| CN | 101683288 A | 3/2010 |
| CN | 201624284 U | 11/2010 |
| CN | 201668525 U | 12/2010 |
| CN | 102215777 A | 10/2011 |
| CN | 202020561 U | 11/2011 |
| CN | 202143656 U | 2/2012 |
| CN | 102596096 A | 7/2012 |
| CN | 102740731 A | 10/2012 |
| CN | 202526334 U | 11/2012 |
| CN | 102846393 A | 1/2013 |
| CN | 103347417 A | 10/2013 |
| CN | 103783811 A | 5/2014 |
| CN | 103876450 A | 6/2014 |
| CN | 103990211 A | 8/2014 |
| CN | 104408840 A | 3/2015 |
| CN | 104433793 A | 3/2015 |
| CN | 104523345 A | 4/2015 |
| CN | 104720914 A | 6/2015 |
| CN | 204411007 U | 6/2015 |
| CN | 204542423 U | 8/2015 |
| CN | 104921830 A | 9/2015 |
| CN | 105146906 A | 12/2015 |
| CN | 105455913 A | 4/2016 |
| CN | 105581505 A | 5/2016 |
| CN | 105640662 A | 6/2016 |
| CN | 205307131 U | 6/2016 |
| CN | 105813595 A | 7/2016 |
| CN | 205359687 U | 7/2016 |
| CN | 105943179 A | 9/2016 |
| CN | 106109041 A | 11/2016 |
| CN | 106137433 A | 11/2016 |
| CN | 106455802 A | 2/2017 |
| CN | 106691614 A | 5/2017 |
| CN | 107088103 A | 8/2017 |
| CN | 107865707 A | 4/2018 |
| CN | 107874860 A | 4/2018 |
| CN | 207253069 U | 4/2018 |
| CN | 108013941 A | 5/2018 |
| CN | 108042233 A | 5/2018 |
| CN | 108125377 A | 6/2018 |
| CN | 208926670 U | 6/2019 |
| CN | 111839783 A | 10/2020 |
| DE | 0099427 | 9/1897 |
| DE | 99427 C | 9/1897 |
| DE | 1632384 A1 | 6/1971 |
| DE | 2209562 A1 | 9/1973 |
| DE | 2901136 A1 | 7/1980 |
| DE | 8134787 U1 | 5/1983 |
| DE | 8610513 U1 | 8/1986 |
| DE | 3724476 A1 | 1/1989 |
| DE | 4029770 A1 | 3/1992 |
| DE | 9417795 U1 | 5/1994 |
| DE | 69021971 T2 | 5/1996 |
| DE | 19541429 A1 | 5/1997 |
| DE | 29703210 U1 | 5/1997 |
| DE | 29520454 U1 | 6/1997 |
| DE | 29807736 U1 | 11/1998 |
| DE | 29904059 U1 | 7/1999 |
| DE | 20018077 U1 | 2/2001 |
| DE | 10023725 A1 | 11/2001 |
| DE | 20209014 U1 | 10/2002 |
| DE | 20216413 U1 | 1/2003 |
| DE | 202004004628 U1 | 7/2004 |
| DE | 10347258 A1 | 5/2005 |
| DE | 202005015767 U1 | 1/2006 |
| DE | 202005019681 U1 | 4/2006 |
| DE | 102006005205 A1 | 9/2006 |
| DE | 102005014095 A1 | 10/2006 |
| DE | 102005045226 A1 | 3/2007 |
| DE | 202009013323 U1 | 4/2010 |
| DE | 202014003540 U1 | 9/2014 |
| DE | 202014009678 U1 | 3/2015 |
| EA | 000234 B1 | 2/1999 |
| EP | 0494878 A1 | 7/1992 |
| EP | 0634151 A2 | 1/1995 |
| EP | 1367957 A1 | 12/2003 |
| EP | 1657485 A1 | 5/2006 |
| EP | 2218559 A1 | 8/2010 |
| EP | 2229917 A1 | 9/2010 |
| EP | 2253359 A1 | 11/2010 |
| EP | 2253360 A1 | 11/2010 |
| EP | 2468213 A1 | 6/2012 |
| EP | 2528471 B1 | 11/2017 |
| ES | 1141731 U | 7/2015 |
| FR | 0341238 A | 8/1904 |
| FR | 341238 A | 8/1904 |
| FR | 2790383 A1 | 9/2000 |
| GB | 2290702 A | 1/1996 |
| GB | 2406503 A | 4/2005 |
| GB | 2538300 A | 11/2016 |
| GB | 2538302 A | 11/2016 |
| GB | 2538304 A | 11/2016 |
| GB | 2555417 A | 5/2018 |
| JP | S62-102433 U | 6/1987 |
| JP | H5-18516 U | 3/1993 |
| JP | H5-237014 A | 9/1993 |
| JP | H7-148020 A | 6/1995 |
| JP | 2531600 B2 | 9/1996 |
| JP | 10-113230 A | 5/1998 |
| JP | 11-103937 A | 4/1999 |
| JP | 2000-201740 A | 7/2000 |
| JP | 2003-304933 A | 10/2003 |
| JP | 2004-222839 A | 8/2004 |
| JP | 2006-61486 A | 3/2006 |
| JP | 2007-14730 A | 1/2007 |
| JP | 2007-516029 A | 6/2007 |
| JP | 2007-518439 A | 7/2007 |
| JP | 2009-129543 A | 6/2009 |
| JP | 2009-268828 A | 11/2009 |
| JP | 2010-527717 A | 8/2010 |
| JP | 2012-86022 A | 5/2012 |
| JP | 2012-135567 A | 7/2012 |
| JP | 2012-161368 A | 8/2012 |
| JP | 2012-521787 A | 9/2012 |
| JP | 2014-200297 A | 10/2014 |
| JP | 2015-163091 A | 9/2015 |
| JP | 2016-214844 A | 12/2016 |
| JP | 2017-164214 A | 9/2017 |
| KR | 10-2007-0000108 A | 1/2007 |
| KR | 10-2010-0025434 A | 3/2010 |
| KR | 10-1242379 B1 | 3/2013 |
| KR | 10-2014-0049050 A | 4/2014 |
| KR | 10-1594087 B1 | 2/2016 |
| KR | 10-1646053 B1 | 8/2016 |
| RU | 2374967 C2 | 12/2009 |
| RU | 2541432 C2 | 2/2015 |
| TW | M405308 U | 6/2011 |
| WO | 90/12557 A1 | 11/1990 |
| WO | 92-02159 A1 | 2/1992 |
| WO | 00/15076 A1 | 3/2000 |

(56) References Cited

FOREIGN PATENT DOCUMENTS

| WO | 02/071971 A1 | 9/2002 |
|---|---|---|
| WO | 2004/021958 A1 | 3/2004 |
| WO | 2005/000541 A1 | 1/2005 |
| WO | 2006/098719 A1 | 9/2006 |
| WO | 2006/134514 A2 | 12/2006 |
| WO | 2007/008908 A1 | 1/2007 |
| WO | 2008/046580 A1 | 4/2008 |
| WO | 2010/055435 A1 | 5/2010 |
| WO | 2010/106524 A2 | 9/2010 |
| WO | 2011/094587 A1 | 8/2011 |
| WO | 2012/033553 A1 | 3/2012 |
| WO | 2014/141211 A1 | 9/2014 |
| WO | 2016/185166 A1 | 11/2016 |
| WO | 2016/201063 A2 | 12/2016 |
| WO | 2017/182301 A1 | 10/2017 |
| WO | 2018/083445 A1 | 5/2018 |
| WO | 2019/243761 A1 | 12/2019 |
| WO | 2019/243762 A1 | 12/2019 |
| WO | 2019/243765 A1 | 12/2019 |

OTHER PUBLICATIONS

Follows et al., U.S. Office Action dated Apr. 6, 2017, directed to U.S. Appl. No. 15/152,116; 16 pages.
International Search Report and Written Opinion dated Jul. 2, 2019, directed to International Application No. PCT/ GB2019/051124; 11 pages.
Marsh et al., U.S. Office Action dated Apr. 29, 2019, directed to U.S. Appl. No. 15/793,498; 13 pages.
Mighall et al., U.S. Office Action dated Jun. 29, 2020, directed to U.S. Appl. No. 15/793,337; 15 pages.
Mighall et al., U.S. Office Action dated Jan. 6, 2021, directed to U.S. Appl. No. 15/793,337; 17 pages.
Mighall et al., U.S. Office Action dated May 13, 2019, directed to U.S. Appl. No. 15/793,337; 11 pages.
Mighall et al., U.S. Office Action dated Sep. 6, 2018, directed to U.S. Appl. No. 15/793,337; 13 pages.
Search Report dated Nov. 29, 2018, directed to GB Application No. 1810144.4; 2 pages.
International Search Report and Written Opinion dated Jul. 1, 2019, directed to PCT Application No. PCT/GB2019/051129; 11 pages.
International Search Report and Written Opinion dated Dec. 21, 2017, directed to International Application No. PCT/GB2017/053137; 12 pages.
Notice of Reasons for Rejection dated Jan. 24, 2019, directed to JP Application No. 2017-205880; 9 pages.
Notification of Reason for Refusal dated Nov. 30, 2020, directed to KR Application No. 10-2019-7012757; 12 pages.
Office Action dated Apr. 17, 2019, directed to CN Application No. 2017213981531; 9 pages.
Office Action received for Chinese Patent Application No. 201980040202.X, dated Aug. 5, 2021, 18 pages (11 pages of English Translation and 7 pages of Original Document).
Office Action received for Chinese Patent Application No. 201980040266.X, dated Aug. 4, 2021, 19 pages (11 pages of English Translation and 8 pages of Original Document).
Office Action received for Chinese Patent Application No. 201980040279.7, dated Jul. 6, 2021, 20 pages (11 pages of English Translation and 9 pages of Original Document).
Office Action received for Chinese Patent Application No. 201980040341.2, dated Jul. 29, 2021, 19 pages (11 pages of English Translation and 8 pages of Original Document).
Official Action dated Jan. 12, 2021, directed to RU Application No. 2019116082; 7 pages.
Rejection Decision dated Feb. 25, 2020, directed to CN Application No. 201711017458.8; 16 pages.
Search Report dated Mar. 23, 2017, directed to GB Application No. 1618073.9; 2 pages.
Search Report dated Nov. 30, 2018, directed to GB Application No. 1810149.3; 1 page.
Search Report dated Nov. 5, 2019, directed to GB Application No. 1910345.6; 1 page.
Search Report dated Nov. 5, 2019, directed to GB Application No. 1910347.2; 1 page.
Notification of Reasons for Refusal received for Japanese Application No. 2020-569929, dated Nov. 30, 2021, 3 pages (2 pages of English Translation and 1 page of Original Document).
Office Action received for Chinese Patent Application No. 202210064903.0, dated Jul. 13, 2023, 20 pages (12 pages of English Translation and 8 pages of Original Document).
Translation for DE 102005045226 (Year: 2005).

* cited by examiner

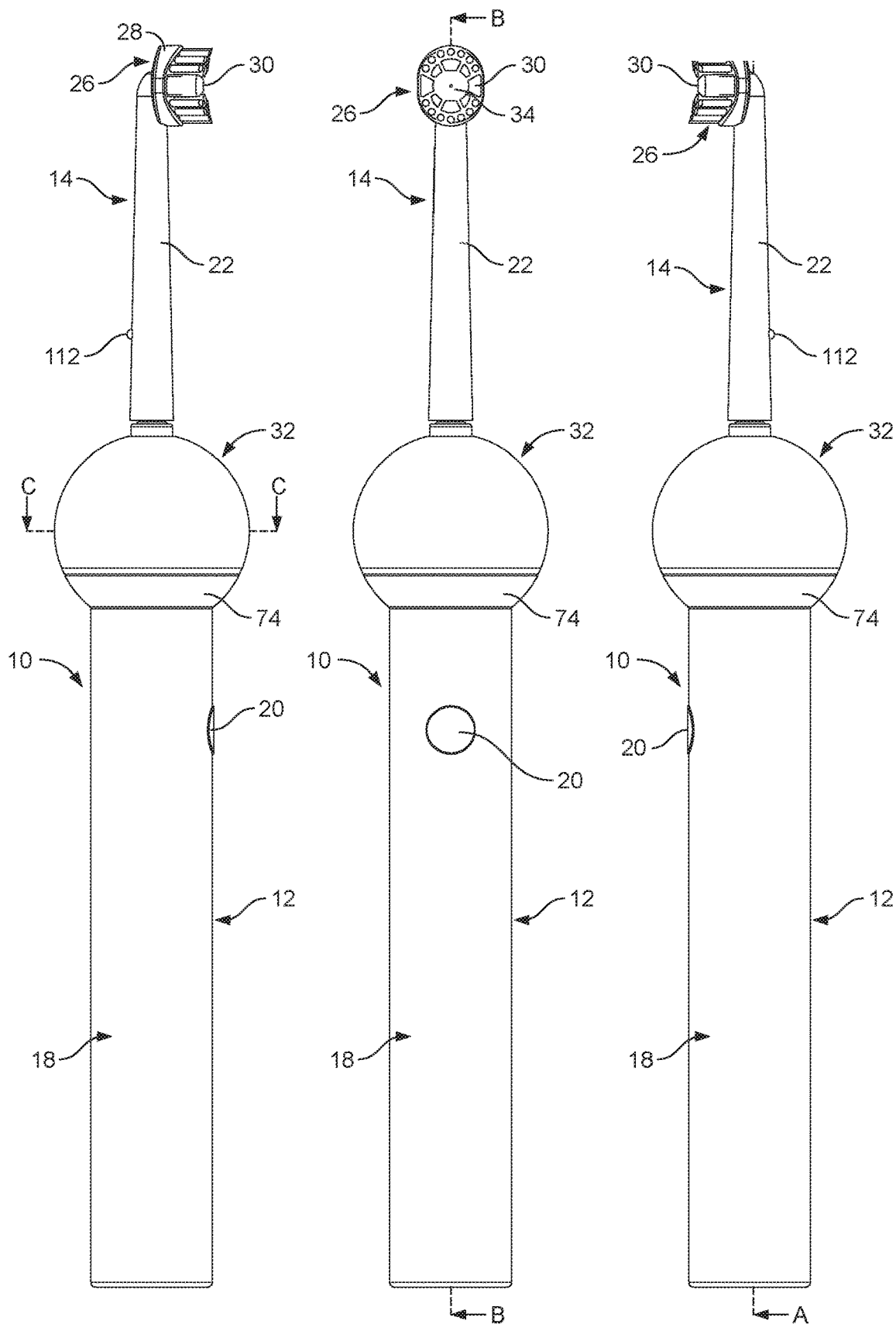

(A-A)

(C-C)

(B-B)

(C-C)

DENTAL TREATMENT APPLIANCE

REFERENCE TO RELATED APPLICATIONS

This application is a national phase application under 35 USC 371 of International Application No. PCT/GB2019/051124, filed Apr. 23, 2019, which claims the priority of United Kingdom Application No. 1810144.4, filed Jun. 20, 2018, the entire contents of each of which are incorporated herein by reference.

FIELD OF THE DISCLOSURE

The present invention generally relates to a treatment appliance, and in particular to a dental treatment appliance.

BACKGROUND OF THE DISCLOSURE

Electric toothbrushes generally comprise a tool which is connected to a handle. The tool comprises a stem and a brush head bearing bristles for brushing teeth. The brush head comprises a static section which is connected to the stem, and at least one moveable section which is moveable relative to the static section, for example with one of a reciprocating, oscillating, vibrating, pivoting or rotating motion, to impart a brushing movement to bristles mounted thereon. The stem houses a drive shaft which couples with a transmission unit within the handle. The transmission unit is in turn connected to a motor, which is driven by a battery housed within the handle. The drive shaft and the transmission unit convert rotary or vibratory motion of the motor into the desired movement of the moveable section of the brush head relative to the static section of the brush head.

It is known to incorporate into an electric toothbrush a fluid delivery system for generating a burst of working fluid for interproximal cleaning. For example, WO2016/185166 describes a toothbrush having a handle and a brush head which includes a nozzle from which working fluid is delivered to the oral cavity of the user. The nozzle is moveable relative to the handle as the appliance is moved along the user's teeth. The toothbrush is operable in a selected one of two different modes. In a first mode, the user depresses a button to actuate the delivery of working fluid from the nozzle. In a second mode, a control circuit actuates the delivery of working fluid to the nozzle automatically depending on a signal received from a sensor for detecting movement of the nozzle relative to the handle, for example as the nozzle moves into, or out from, an interproximal gap in the user's teeth.

The toothbrush includes a fluid reservoir which surrounds around a stem extending between the handle and the brush head. The fluid reservoir includes a fluid port which is connectable to the fluid delivery system, and the handle includes a seal which surrounds the fluid port to inhibit the leakage of working fluid from the fluid reservoir. The fluid reservoir is rotatable about the stem to expose the fluid port to enable the fluid reservoir to be replenished.

SUMMARY OF THE DISCLOSURE

In a first aspect, the present invention provides a dental cleaning appliance comprising a handle; a fluid reservoir for storing a working fluid, the fluid reservoir comprising a fluid port; and a fluid delivery system for receiving working fluid from the reservoir, and for delivering working fluid to the oral cavity of a user; wherein the fluid reservoir is moveable along the handle between a first position in which the fluid port is connected to the fluid delivery system, and a second position in which the fluid port is exposed for replenishment of the fluid reservoir.

In comparison to the appliance disclosed in WO2016/185166, this aspect of the invention can increase the life of a seal for engaging the fluid reservoir when the fluid reservoir is in its first position, to inhibit the leakage of working fluid from the fluid reservoir, through a change in the motion of the fluid reservoir relative to the handle. By moving the fluid reservoir along the length of the handle between the first and second positions to expose the fluid port, as opposed to rotating the fluid reservoir about the stem, wear of the seal can be reduced. The movement of the fluid reservoir relative to the handle may be in a direction which is substantially parallel to the longitudinal axis of the handle, or at an angle which is inclined at an acute angle to the longitudinal axis of the handle. The fluid reservoir may move along a path arranged relative to the handle so that, as the fluid reservoir moves relative to the handle, a component of its motion is aligned with the longitudinal axis of the handle. For example, the fluid reservoir may move in a spiral path extending about the handle.

The fluid reservoir may be free to move to one of a number of different positions intermediate the first position and the second position. Alternatively the fluid reservoir may be urged towards either the first position or the second position depending on its position relative to the handle. For example, the appliance may comprise a spring mechanism, such as an over-centre mechanism, for urging the fluid reservoir towards the first position or the second position, or an arrangement of magnets for attracting the fluid reservoir towards either the first position or the second position depending on its current position relative to the handle. The fluid reservoir is preferably slidable along the handle.

To maximize the capacity of the fluid reservoir and to provide for a relatively even weight distribution about the longitudinal axis of the appliance, the fluid reservoir preferably extends around at least part of the handle. In a preferred embodiment, the fluid reservoir surrounds the handle. The fluid reservoir is preferably annular in shape.

The fluid delivery system preferably comprises a nozzle for delivering working fluid to the oral cavity of the user. The fluid delivery system preferably further comprises a pump and a controller for actuating the pump to draw working fluid from the fluid reservoir and eject working fluid towards the nozzle. As the nozzle is moved between adjacent teeth of the user, the user may depress a button of a user interface provided on the handle to actuate the pump to cause working fluid to be ejected from the nozzle. Alternatively, the appliance may be configured to actuate the delivery of working fluid to the oral cavity of the user automatically at a fixed frequency, for example between 0.5 and 5 Hz. The controller is preferably arranged to actuate the pump to eject a burst of working fluid towards the nozzle. The volume of each burst of working fluid which is generated by the fluid delivery system is preferably less than 1 ml, more preferably less than 0.5 ml. In a preferred embodiment, the volume of the burst of working fluid generated by the fluid delivery system is in the range from 0.1 to 0.4 ml. The fluid delivery system is preferably configured to deliver a burst of working fluid to the nozzle at a static pressure in the range from 3 to 10 bar.

The handle preferably comprises a number of sections, which are preferably integral with each other. The handle preferably comprises a first section, or "grip section", which is held or grasped by a user during use of the appliance. The grip section preferably comprises a user interface which is engaged by the user during use of the appliance, for example to actuate the delivery of working fluid from the fluid delivery system. The handle preferably further comprises a second section which is spaced from the grip section, and along which the fluid reservoir moves relative to the handle. The second section of the handle is preferably located proximate to an end of the handle, preferably the end of the handle which is closest to the nozzle, and so can be referred to as an "end section" of the handle. The end section preferably defines, at least in part, the end of the handle which is closest to the nozzle. When in its first position, the fluid reservoir preferably encloses or surrounds the end section of the handle so that it is not visible to the user of the appliance.

The end section of the handle preferably has a cross-section, in a plane perpendicular to the longitudinal axis of the handle, which is smaller than that of the grip section of the handle. This can allow the appliance to have a relatively uniform appearance when the fluid reservoir is in its first position, for example when the fluid reservoir has an external diameter which is the same as that of the grip section of the handle. Alternatively, or additionally, this can also allow, for a given fixed capacity of the fluid reservoir, the width of the fluid reservoir to be minimised.

The appliance preferably comprises means for inhibiting rotation of the fluid reservoir as it moves between the first position and the second position. This can ensure that the fluid port remains in angular alignment with a fluid inlet of the fluid delivery system as it moves along the handle between the first position and the second position. For example, the fluid reservoir may move along an axially-aligned slot or groove formed in the end section of the handle. In a preferred embodiment, the end section of the handle comprises a tubular external surface and the fluid reservoir comprises a tubular internal surface which surrounds the external surface of the end section of the handle when the fluid reservoir is in its first position. The tubular external surface of the end section of the handle preferably has substantially the same shape as the tubular internal surface of the fluid reservoir, which is preferably non-circular in a plane perpendicular to the longitudinal axis of the handle. In a preferred embodiment, the external surface of the end section has an irregular shape in that plane; two opposing parallel surfaces and two opposing curved surfaces which define a "racetrack" shape. However, the external surface may have any desired shape, such as a regular or irregular polygon, which, when matched by the internal surface of the fluid reservoir, inhibits rotation of the fluid reservoir relative to the handle.

The handle preferably comprises a seat for receiving the fluid reservoir when in its first position. The seat preferably comprises a fluid inlet of the fluid delivery system which receives fluid from the fluid reservoir when in its first position. In a preferred embodiment, the fluid port of the fluid reservoir is located in a base of the fluid reservoir which faces towards the seat. The seat is preferably located between the grip section and the end section of the handle, and is preferably arranged perpendicular to the longitudinal axis of the handle. Each one of the seat and the base of the fluid reservoir is preferably annular in shape. The seat and the base of the fluid reservoir preferably have substantially the same external diameter.

The seat preferably has a locally-enlarged cross-section compared to the grip section of the handle. Adjoining external surfaces of the seat and the fluid reservoir preferably have substantially the same curvature, so that when the fluid reservoir is in its first position the fluid reservoir and the seat together appear as a single curved unit. In the preferred embodiment, the adjoining external surfaces of the seat and fluid reservoir preferably have a spherical or spheroidal curvature.

As mentioned above, the fluid reservoir is preferably urged towards its first position, in which the fluid port of the fluid reservoir is connected to the fluid delivery system. This can reduce the likelihood of the fluid reservoir moving away from its first position during use of the appliance in the event that the fluid reservoir is accidentally knocked or otherwise impacted during use of the appliance. This can, in turn, reduce the risk of unwanted leakage of fluid from the fluid reservoir during use of the appliance.

In a second aspect, the present invention provides a dental cleaning appliance comprising a handle; a fluid reservoir for storing a working fluid, the fluid reservoir comprising a fluid port; and a fluid delivery system for receiving working fluid from the reservoir, and for delivering working fluid to the oral cavity of a user; wherein the fluid reservoir is moveable relative to the handle between a first position in which the fluid port is connected to the fluid delivery system, and a second position in which the fluid port is exposed to allow the fluid reservoir to be replenished, the appliance comprising means for urging the fluid reservoir towards the first position.

Preferably, the urging means is configured to magnetically attract the fluid reservoir towards its first position. In a preferred embodiment, the urging means comprises at least one permanent magnet carried by the fluid reservoir. The fluid port and the magnet(s) are preferably located on a common wall of the fluid reservoir, which in the preferred embodiment is the base of the fluid reservoir. As mentioned above, the base of the fluid reservoir is preferably annular in shape, and so the fluid port and the magnets are preferably angularly spaced about the base of the fluid reservoir. In a preferred embodiment, the fluid reservoir comprises two diametrically opposed magnets of the same polarity.

The urging means may further comprise at least one permanent magnet of opposite polarity located on the handle, and to which the magnet(s) of the fluid reservoir are attracted. Alternatively, the handle may comprise ferromagnetic material to which the magnet(s) of the fluid reservoir are attracted. The ferromagnetic material is preferably located on or adjacent the seat of the handle, and is preferably in the form of a loop or a ring which extends around the longitudinal axis of the handle.

The fluid reservoir moves away from the seat, and preferably towards the nozzle, as it moves from its first position towards its second position. The appliance preferably comprises a stem which extends between the handle and the nozzle. When the fluid reservoir is in its second position, preferably at least part of the fluid reservoir extends about the stem. In a preferred embodiment, substantially only the base of the fluid reservoir continues to extend around the handle when the fluid reservoir is in its second position. To prevent the fluid reservoir from becoming fully detached from the handle as it moves away from the first position, the stem preferably comprises means for inhibiting movement of the fluid reservoir beyond the second position.

In a third aspect, the present invention provides a dental cleaning appliance comprising a handle; a fluid reservoir for storing a working fluid, the fluid reservoir comprising a fluid port; a fluid delivery system for receiving working fluid from the reservoir, the fluid delivery system comprising a nozzle for delivering working fluid to the oral cavity of a user; and a stem extending between the handle and the nozzle; wherein the fluid reservoir is moveable between a first position in which the fluid port is connected to the fluid delivery system, and a second position in which the fluid port is exposed to allow the fluid reservoir to be replenished, and wherein the stem comprises means for inhibiting movement of the fluid reservoir beyond the second position.

The inhibiting means preferably comprises a stop member protruding from an external surface of the stem. As the fluid reservoir reaches the second position, the stop member engages part of the fluid reservoir to inhibit movement of the fluid reservoir beyond the second position. The stop member may be arranged to engage an internal wall of the fluid reservoir, for example a wall which defines the tubular internal surface of the fluid reservoir. In a preferred embodiment, the stop member is arranged to engage an external wall of the fluid reservoir when the fluid reservoir is in its second position. As mentioned above, the external wall of the fluid reservoir preferably has a curvature which is substantially spherical or spheroidal. The external wall is preferably shaped such that a portion of the external wall defines an aperture through which the stem passes when the fluid reservoir is in its second position. The stop member is preferably arranged to engage that portion of the external wall when the fluid reservoir is in its second position.

The stem is preferably detachably connected to the handle. This allows the stem to be replaced, for example, when the nozzle has become worn, to allow a replacement stem having a different size or shape to be connected to the handle, or to allow a different user to attach a personal stem to the handle. The stem preferably forms an interference fit with the handle.

The fluid reservoir is preferably detachably connected to the handle. The fluid reservoir may be detached from the handle, for example, for replacement of the fluid reservoir. Preferably, the fluid reservoir is detachable from the handle only following the detachment of the stem from the handle.

The appliance may be in the form of a dedicated interproximal cleaning appliance for cleaning between the gaps in the user's teeth. Alternatively, the appliance may be in the form of a toothbrush which has the additional function of improved interproximal cleaning through the emission of working fluid into the interproximal gap. Where the appliance is in the form of a toothbrush, the cleaning tool, or stem, preferably comprises a plurality of bristles. The bristles are preferably arranged around the nozzle, and may be arranged circumferentially about the nozzle. A plurality of bristles may be attached to a static section of the cleaning tool, which section is not moveable relative to the handle. Alternatively, or additionally, a plurality of bristles may be attached to a moveable section of the cleaning tool, which section is moveable relative to the handle.

In a preferred embodiment, the appliance comprises a brush unit comprising a bristle carrier and a plurality of bristles mounted on the bristle carrier, with the bristle carrier being moveable relative to the handle. The appliance comprises a drive mechanism for driving the movement of the bristle carrier relative to the handle. The drive mechanism preferably comprises a transmission unit connected to the bristle carrier, and a drive unit for driving the transmission unit to move the bristle carrier relative to the handle. The drive unit is preferably located in the handle, and more preferably located in the end section of the handle. The fluid reservoir preferably extends about at least part of the drive unit. In a preferred embodiment, the drive unit comprises a motor and the fluid reservoir extends about the motor of the drive unit. Accommodating the motor in the end section of the handle can reduce the number of components of the appliance which are housed within the grip section of the handle, and so can enable the shape of the grip section to be optimized for being grasped by the user.

In a fourth aspect, the present invention provides a dental cleaning appliance comprising a handle; a fluid reservoir for storing a working fluid; a fluid delivery system for receiving working fluid from the reservoir, and for delivering working fluid to the oral cavity of a user; a brush unit comprising a bristle carrier and a plurality of bristles mounted on the bristle carrier; and a drive unit for driving movement of the bristle carrier relative to the handle; wherein the fluid reservoir extends about at least part of the drive unit.

The drive unit may be arranged to move the bristle carrier relative to the stem. Alternatively, the drive unit may be arranged to move the stem, and thus the bristle carrier, relative to the handle. The stem is preferably mounted on the transmission unit. The fluid reservoir preferably extends about at least part of the transmission unit.

The transmission unit is preferably in the form of a shaft which is moved, preferably vibrated, relative to the handle by the motor. The frequency of the vibration of the shaft is preferably in the range from 250-300 Hz. The motor preferably extends about the shaft so that the shaft vibrates relative to the handle upon excitation of the motor.

The transmission unit preferably defines part of the fluid delivery system. The shaft preferably comprises a bore which defines part of the fluid delivery system.

The fluid delivery system preferably comprises a handle conduit system and a cleaning tool conduit system for receiving fluid from the handle conduit system. The cleaning tool conduit system preferably comprises at least one conduit for conveying the burst of working fluid to the nozzle. In a preferred embodiment, the stem comprises a bore which defines a fluid conduit of the cleaning tool conduit system. The handle conduit system preferably comprises the fluid inlet for receiving working fluid from the fluid port of the fluid reservoir, and a plurality of conduits for conveying working fluid between the fluid inlet port, the pump and a fluid outlet of the handle. The plurality of conduits comprises a fluid inlet conduit for conveying fluid from the fluid inlet towards the pump, and a fluid outlet conduit for conveying a burst of working fluid from the pump to the fluid outlet. At least part of the fluid outlet conduit is preferably defined by the bore of the transmission unit, and thus preferably extends through the motor. At least part of the fluid inlet conduit preferably extends from the fluid inlet to the pump adjacent the external surface of the motor. At least part of the inlet conduit is preferably defined by the seat of the handle.

Conveying fluid to the pump along the outside of the motor, and subsequently conveying fluid from the pump through the motor, can further improve the compactness of the appliance. In a fifth aspect, the present invention provides a dental cleaning appliance comprising a handle; a fluid reservoir for storing a working fluid; a fluid delivery system for receiving working fluid from the reservoir, the fluid delivery system comprising a pump, an inlet conduit for conveying working fluid from the reservoir towards the pump, a nozzle for delivering working fluid to the oral cavity of a user, and an outlet conduit for conveying working fluid from the pump towards the nozzle; a brush unit comprising a bristle carrier and a plurality of bristles mounted on the bristle carrier; and a drive unit for driving movement of the bristle carrier relative to the handle, the drive unit comprising a motor; wherein at least part of the inlet conduit is adjacent to the external surface of the motor, and at least part of the outlet conduit extends through the motor.

Features described above in connection with the first aspect of the invention are equally applicable to the second to fifth aspects of the invention, and vice versa.

The treatment appliance is preferably a handheld treatment appliance, and is preferably a surface treating appliance. In preferred embodiments of the invention, the appliance is a dental treatment appliance. In a preferred embodiment, the appliance is an electric toothbrush having a fluid delivery system for delivering a fluid to the oral cavity of the user. This fluid may be toothpaste, or a fluid for improved interproximal cleaning. Alternatively, the appliance may not include any bristles or other elements for brushing teeth, and may be in the form of a dedicated interproximal treatment appliance.

BRIEF DESCRIPTION OF THE FIGURES

Preferred features of the invention will now be described, by way of example only, with reference to the accompanying drawings, in which:

FIG. 2(a) is a right side view of the appliance of FIG. 1(a), FIG. 2(b) is a front view of the appliance of FIG. 1(a) and FIG. 2(c) is a left side view of the appliance of FIG. 1(a);

DETAILED DESCRIPTION OF THE DISCLOSURE

Figure 1A:
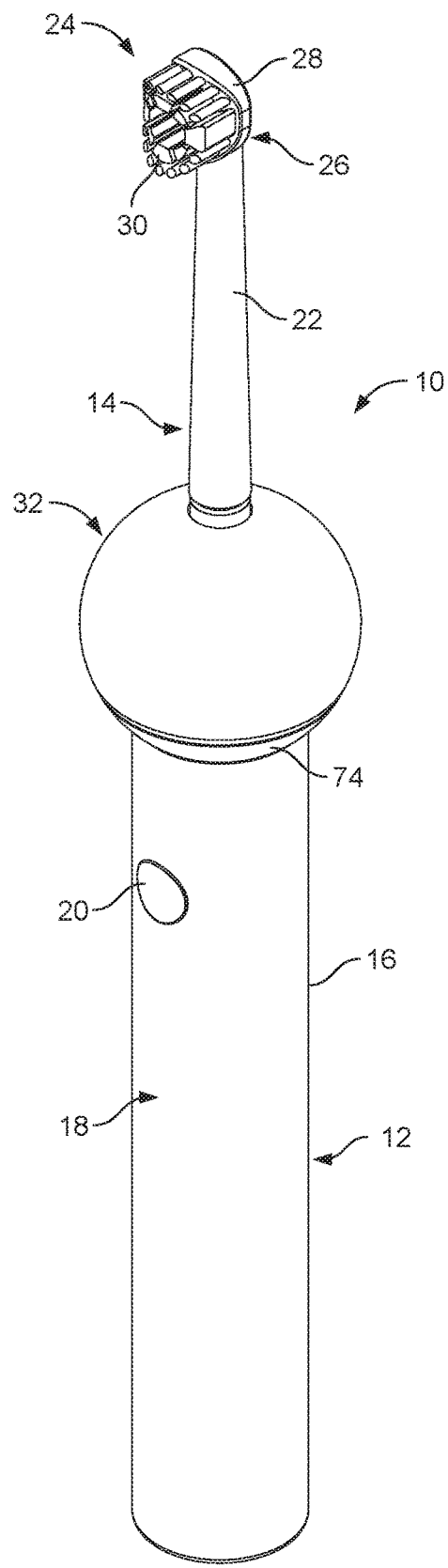
FIG. 1(a) is a perspective view, from the front, of a dental cleaning appliance, with a fluid reservoir in a first position.
Figure 1B:
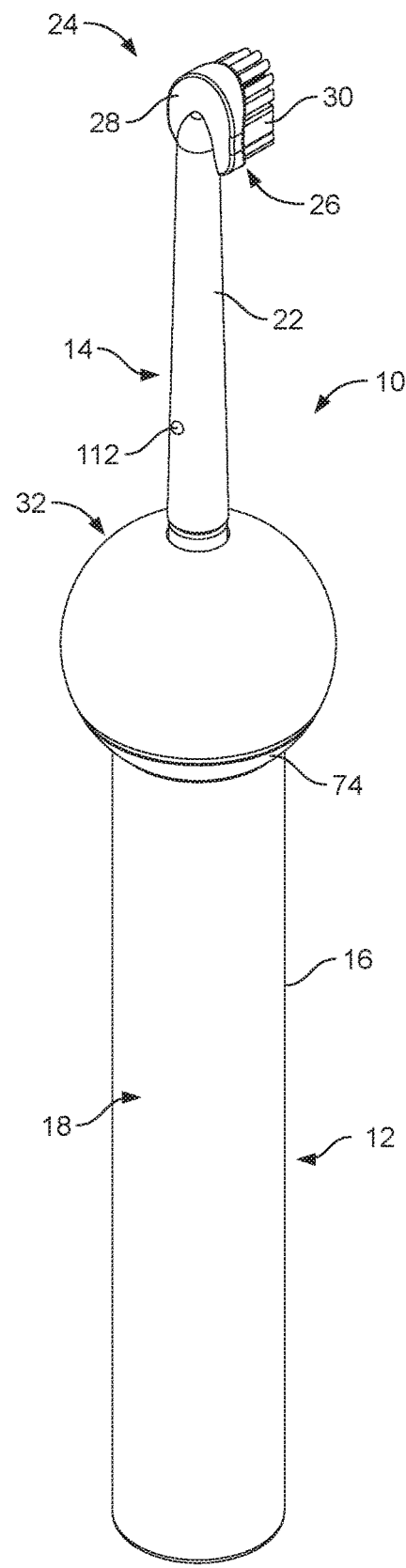
FIG. 1(b) is a perspective view, from the rear, of the dental cleaning appliance of FIG. 1(a)

FIGS. 1(a) to 2(c) illustrate external views of an embodiment of a dental cleaning appliance 10. In this embodiment, the appliance is in the form of a handheld appliance, which is in the form of an electric toothbrush having an integrated assembly for dispensing a working fluid for improved interproximal cleaning.

The appliance 10 comprises a handle 12 and a cleaning tool 14. The handle 12 comprises an external body 16 which is preferably formed from plastics material. The body 16 comprises a grip section 18 which is gripped by a user during use of the appliance 10. The grip section 18 is preferably generally cylindrical in shape. The handle 12 comprises a user operable button 20 which is located within an aperture formed in the body 16 so as to be accessible to the user. Optionally, the handle 12 may comprise a display which is positioned so as to be visible to a user during use of the appliance.

The cleaning tool 14 comprises a stem 22 and a head 24. The stem 22 is elongate in shape, which serves to space the head 24 from the handle 12 to facilitate user operability of the appliance 10. In this embodiment, the head 24 of the cleaning tool 14 comprises a brush unit 26, which comprises a bristle carrier 28 and a plurality of bristles 30 mounted on the bristle carrier 28. However, in other embodiments the cleaning tool 14 may be provided without a brush unit 26 so that the appliance is in the form of a dedicated interproximal cleaning appliance for cleaning between the gaps in the user's teeth.

The cleaning tool 14 also comprises a fluid reservoir 32 for storing a working fluid, and a nozzle 34 for delivering working fluid to the oral cavity of the user during use of the appliance 10. The working fluid is preferably a liquid working fluid, and in this embodiment is water. As described in more detail below, the fluid reservoir 32 is mounted on an end section 36 of the handle 12 so as to extend about the end section 36 of the handle 12. In this embodiment which includes a brush unit 26, the brush unit 26 extends at least partially around the nozzle 34.

Figure 3:
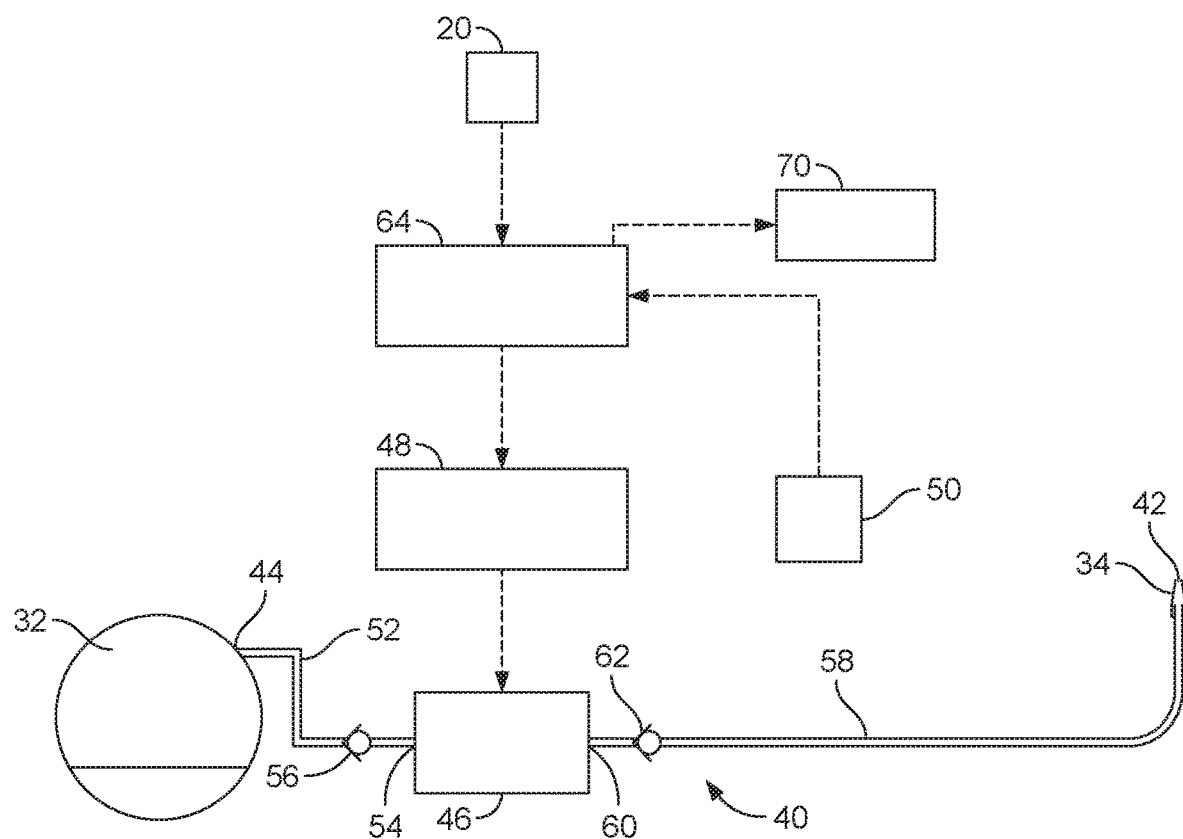
FIG. 3 is a schematic illustration of a fluid delivery system of the appliance.

The nozzle 34 forms part of a fluid delivery system 40 for receiving working fluid from the fluid reservoir 32 and for delivering bursts of working fluid to the oral cavity of a user during use of the appliance 10. Each burst of working fluid preferably has a volume which is less than 1 ml, more preferably less than 0.5 ml. The fluid delivery system 40 is illustrated schematically in FIG. 3. The tip of the nozzle 34 comprises a fluid outlet 42 through which a burst of working fluid is delivered to the oral cavity of the user. In overview, the fluid delivery system 40 comprises a fluid inlet 44 for receiving working fluid from the fluid reservoir 32. In this embodiment, the working fluid is a liquid working fluid, which is preferably water. The fluid delivery system 40 comprises a pump assembly for drawing working fluid from the fluid reservoir 32 through the fluid inlet 44, and for delivering a burst of working fluid to the nozzle 34. The pump assembly is located within the grip section 18 of the handle 12, and comprises a positive displacement pump 46 and a drive for driving the pump 46. The drive preferably comprises a pump motor 48. A battery 50 for supplying power to the pump motor 48 is also located in the handle 12. The battery 50 is preferably a rechargeable battery.

A first conduit 52 connects the fluid inlet 44 of the fluid delivery system 40 to a fluid inlet 54 of the pump 46. A first one-way valve 56 is located between the fluid inlet 44 and the pump 46 to prevent water from returning to the fluid reservoir 32 from the pump 46. A second conduit 58 connects a fluid outlet 60 of the pump 46 to the nozzle 34. A second one-way valve 62 is located between the pump 46 and the nozzle 34 to prevent water from returning to the pump 46. A control circuit 64 controls the actuation of the motor 48, and so the pump motor 48 and the control circuit 64 provide a drive for driving the pump 46. The battery 50 supplies power to the control circuit 64. The control circuit 64 includes a motor controller which supplies power to the pump motor 48.

In this embodiment, the control circuit 64 receives signals generated when the user depresses the button on the handle 12 of the appliance 10. Alternatively, or additionally, the control circuit 64 may receive signals which are generated by a sensor located within the appliance 10, or which are received from a remote device, such as a display or a personal device. For brevity, in the following description the control circuit 64 receives signals which are generated when the user operates the button 20.

Figure 4:
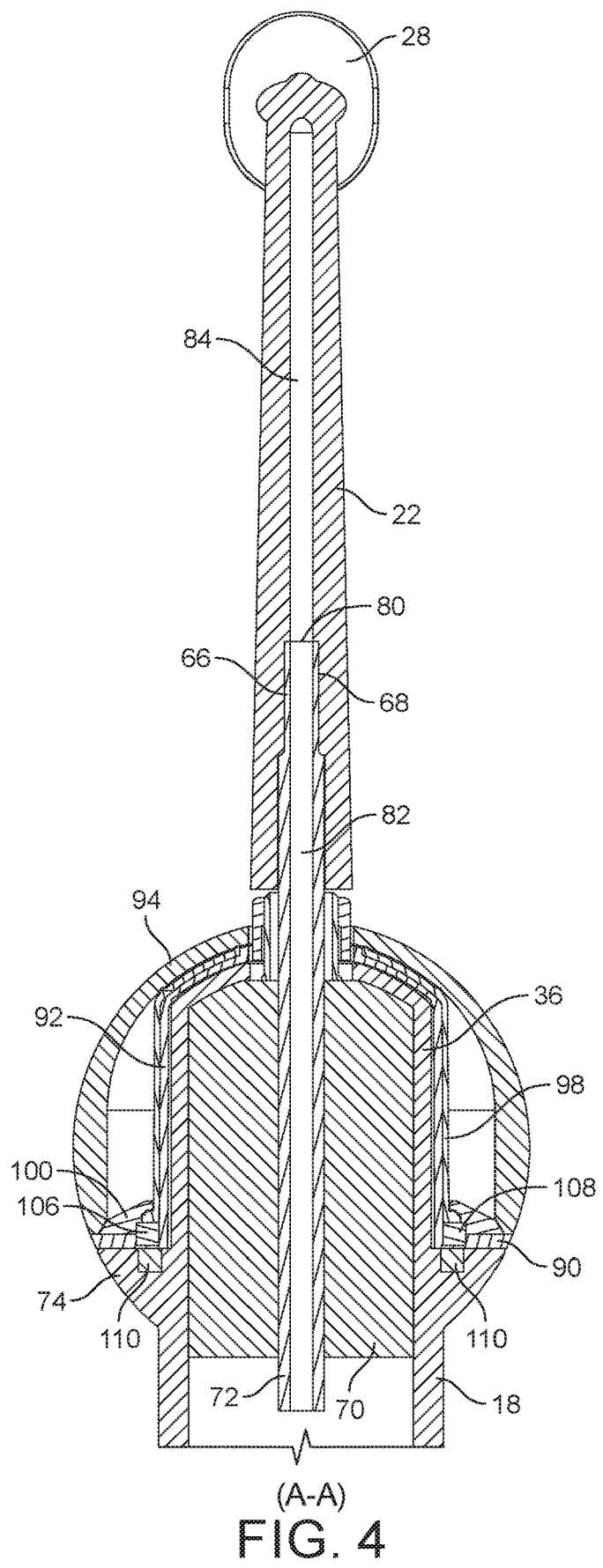
FIG. 4 is a sectional view along line A-A in FIG. 2(c)
Figure 5:
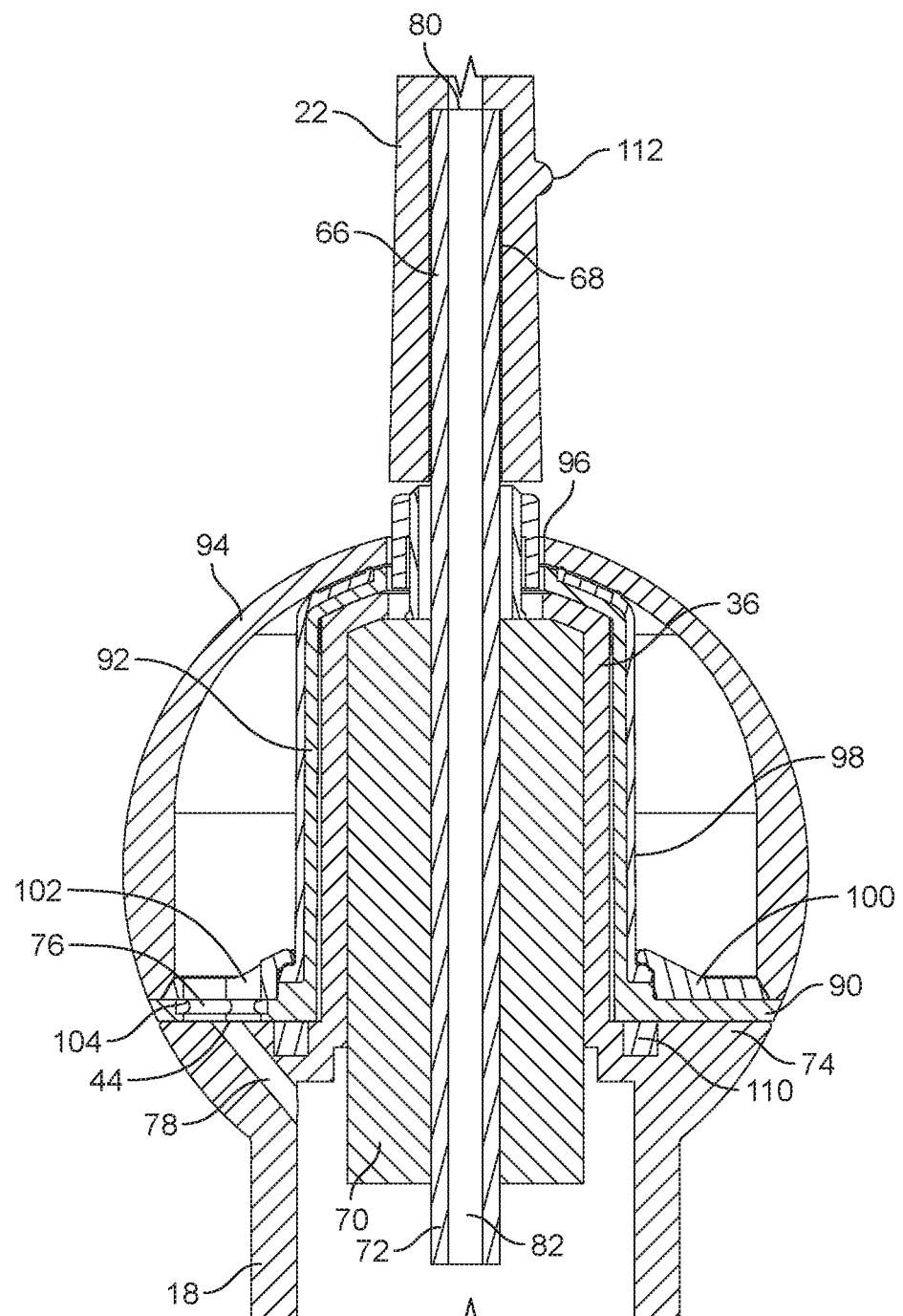
FIG. 5 is a sectional view along line B-B in FIG. 2(b)
Figure 6:
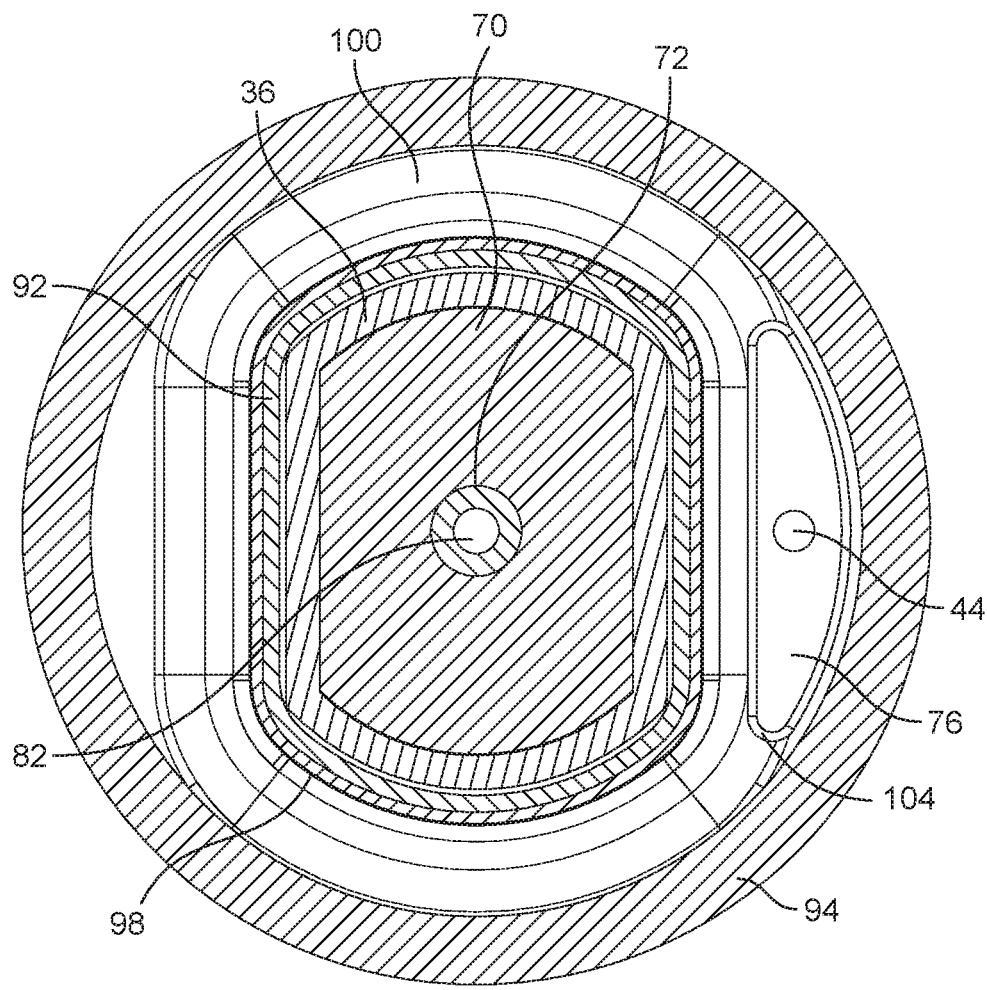
FIG. 6 is a sectional view along line C-C in FIG. 2(a)

The cleaning tool 14 is detachably connected to the handle 12. With reference also to FIGS. 4 to 6, the handle 12 comprises a male connector, preferably in the form of a spigot 66, which is received by a complementary female connector, preferably in the form of a recessed connector 68, of the cleaning tool 14. The spigot 66 protrudes outwardly from the end section 36 of the handle 12, and preferably in a direction which is parallel to, and more preferably collinear with, a longitudinal axis of the handle 12.

The appliance 10 comprises a drive mechanism for driving the movement of the stem 22, and thus the bristle carrier 28, relative to the handle 12. The drive mechanism comprises a transmission unit and a drive unit for driving the transmission unit to move the stem 22 relative to the handle 12. The drive unit comprises a drive motor 70 which is located within the end section 36 of the handle 12. The transmission unit comprises a shaft 72 which is driven by the drive motor 70 to vibrate relative to the handle 12. The spigot 66 is connected to, and is preferably integral with, the shaft 72. The control circuit 64 includes a motor controller which supplies power to the drive motor 70. The button 20 may also be used to activate and deactivate the drive motor 70, for example by depressing the button 20 for a predetermined duration to stop a cleaning session using the appliance 10. Alternatively, a separate button (not shown) may be provided for activating and deactivating the drive motor 70. The drive motor 70 is preferably arranged to vibrate the stem 22 so that the bristles 30 are swept in a sideways motion, that is, perpendicular to the longitudinal axis of the handle 12, at a frequency in the range from 250 to 300 Hz, and so that the angular displacement of the bristles 30 is in the range from 5 to 15°.

The handle 12 comprises a seat 74 for receiving the fluid reservoir 32. The seat 74 is located between the grip section 18 and the end section 36 of the handle 12. The seat 74 comprises the fluid inlet 44 of the fluid delivery system 40. The fluid inlet 44 receives fluid from a fluid port 76 of the fluid reservoir 32. The first conduit 52 of the fluid delivery system comprises an inlet section 78 which extends through the seat 74 from the fluid port 76 towards the pump 46. The inlet section 78 of the first conduit 52 thus passes along the outside of the drive motor 70, adjacent to the external surface of the drive motor 70, towards the pump 46.

The second conduit 58, which connects the pump 46 to the nozzle 34, comprises a handle conduit section located within the handle 12, and a cleaning tool conduit section located within the cleaning tool 14. The handle conduit section extends from the fluid outlet 60 of the pump 46 to a handle fluid outlet 80 located at the end of the spigot 66. The handle conduit section comprises an outlet section 82 which is defined by the bore of the shaft 72, and which passes through the drive motor 70 towards the cleaning tool 14. Working fluid thus passes external to the drive motor 70 in a first direction towards the pump 46, and subsequently through the drive motor 70 in a second direction, opposite to the first direction, away from the pump 46. The cleaning tool conduit section extends from a cleaning tool fluid inlet port defined by the recessed connector 68 of the cleaning tool 14 towards the nozzle 34. The cleaning tool conduit section comprises a conduit 84 which is defined by a bore of the stem 22 of the cleaning tool 14.

The fluid reservoir 32 preferably has a capacity in the range from 5 to 50 ml, and in this embodiment has a capacity of 10 ml. The fluid reservoir 32 comprises a base 90 in which the fluid port 76 is formed. The base 90 is annular in shape, and extends outwardly from a tubular inner wall 92 of the fluid reservoir 32. With particular reference to FIG. 6, the inner wall 92 of the fluid reservoir 32 has a tubular internal surface which surrounds the external surface of the end section 36 of the handle 12. Each of these surfaces preferably has a non-circular cross-section perpendicular to the longitudinal axis of the handle 12. In this embodiment, each of these surfaces has such a cross-section having a "racetrack" shape, insofar as the cross-sectional shape comprises two parallel opposing side surfaces and two curved opposing side surfaces.

As shown in FIGS. 4 and 5, the end section 36 of the handle 12 preferably has a cross-section, in a plane perpendicular to the longitudinal axis of the handle 12, which is smaller than that of the grip section 18 of the handle 12. This can allow, for a given fixed capacity of the fluid reservoir 32, the width of the fluid reservoir 32 to be minimised.

The fluid reservoir 32 further comprises an external wall 94 which extends from the edge of the base 90 to the end of the inner wall 92 which is remote from the base 90. At least part of the external wall 94 of the fluid reservoir 32 is preferably transparent to allow a user to observe the contents of the fluid reservoir 32, and so assess whether the fluid reservoir 32 requires replenishment prior to the desired use of the appliance 10. The external wall 94 preferably has a shape which is symmetrical about the longitudinal axis of the handle 12. The external wall 94 preferably has a curved shape, more preferably a convex curved shape, but alternatively the external wall 94 may have a polygonal or faceted shape. In this embodiment, the external wall 94 has a spherical curvature. The adjoining portion of the external side surface of the seat 74 also has a similar spherical curvature so that, as shown in FIGS. 2(a) to 2(c), together the fluid reservoir 32 and the seat 72 appear to the user as a single spherically curved unit. The end of the external wall 94 which is remote from the base 90 defines a circular aperture 96 through which the shaft 72 of the drive mechanism passes.

The fluid reservoir 32 also comprises a diaphragm 98. The diaphragm 98 is tubular in shape, and surrounds the inner wall 92 of the fluid reservoir 32. The upper end (as illustrated in FIGS. 4 and 5) of the diaphragm 98 is held between the inner wall 92 and the external wall 94, whereas as the lower end of the diaphragm 98 is retained by an annular seal 100 extending over the base 90 of the fluid reservoir 32. The annular seal 100 comprises an aperture 102 which allows fluid to enter the fluid delivery system 40 from the fluid reservoir 32; an o-ring seal 104 forms a seal between the base 90 and the annular seal 100 to inhibit leakage of fluid from between the base 90 and the annular seal 100.

The diaphragm 98 thus has an external surface which faces the external wall 94 of the fluid reservoir 32, and which defines with the external wall 94 and the annular seal 100 the capacity of the fluid reservoir 32. As the diaphragm 98 is visible to the user through at least part of the external wall 94, the external surface of the diaphragm 98 may bear an identifier for user identification of the cleaning tool 14.

As described in WO2016/185166, the contents of which are incorporated herein by reference, the thickness of the diaphragm 98, and the material from which the diaphragm 98 is formed, are selected so that at least part of the diaphragm 98 is moveable relative to the external wall 94 in response to a pressure differential which is established across the diaphragm 98 as working fluid is drawn from the fluid reservoir 32 by the pump 46. An expansion chamber which is located between the inner wall 92 and the diaphragm 98 is open to the atmosphere to allow atmospheric air to enter the expansion chamber as the diaphragm 98 moves towards the external wall 94 as working fluid is supplied to the fluid delivery system 40. One or more apertures (not shown) are formed in the inner wall 92 to allow atmospheric air to enter the expansion chamber, for example, from an air flow path which extends between the fluid reservoir 32 and the end section 36 of the handle 12. As the diaphragm 98 expands towards its fully expanded configuration, the size and shape of the diaphragm 98 approaches that of the external wall 94. In other words, when the diaphragm 98 is in a fully expanded configuration, which occurs when the fluid reservoir 32 is substantially empty, the size and the shape of the diaphragm 98 are substantially the same as the size and the shape of the external wall 94 of the fluid reservoir 34. Thus, the maximum volume of the expansion chamber is preferably substantially the same as the maximum volume of the fluid reservoir 32.

Figure 7A:
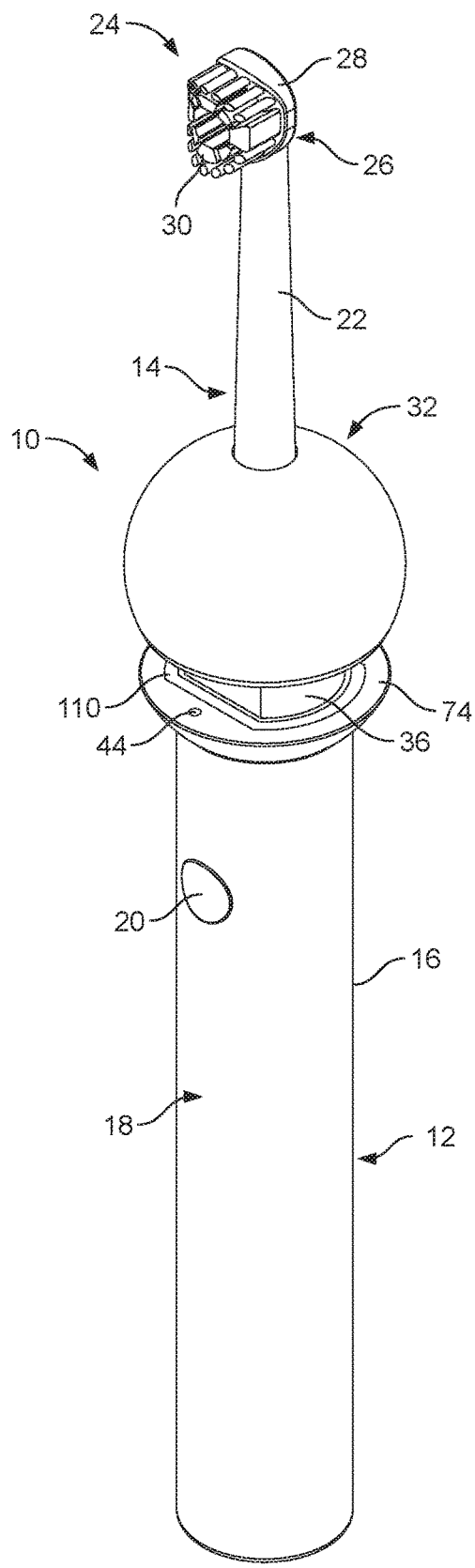
FIG. 7(a) is a perspective view, from the front, of the dental appliance with the fluid reservoir moved away from the first position.
Figure 7B:
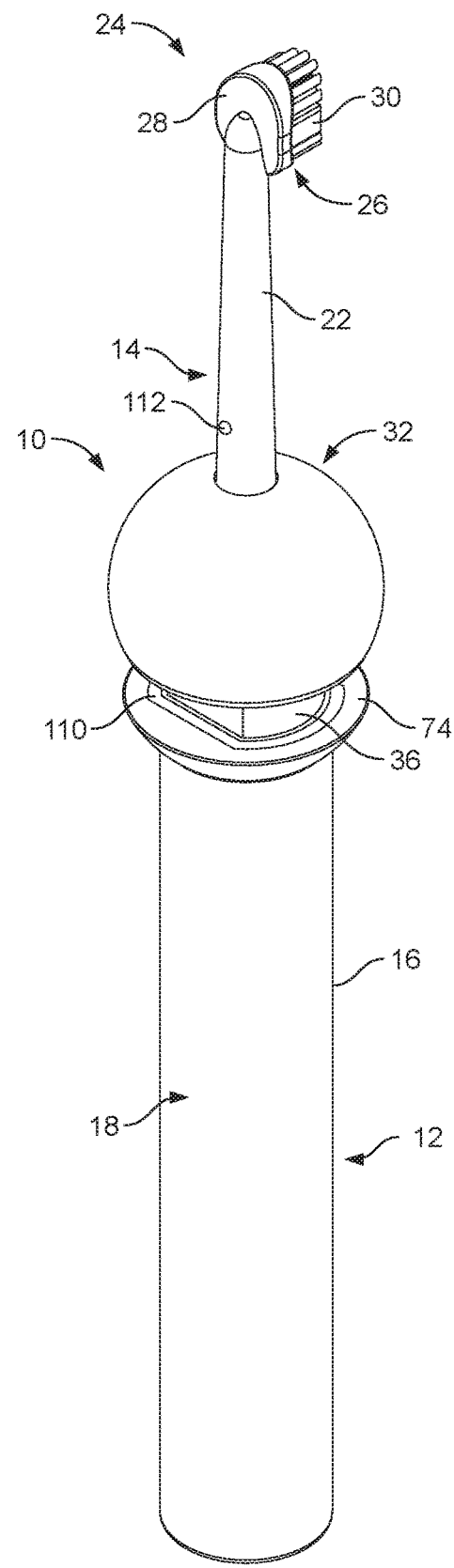
FIG. 7(b) is a perspective view, from the rear, of the dental cleaning appliance of FIG. 7(a)
Figure 8:
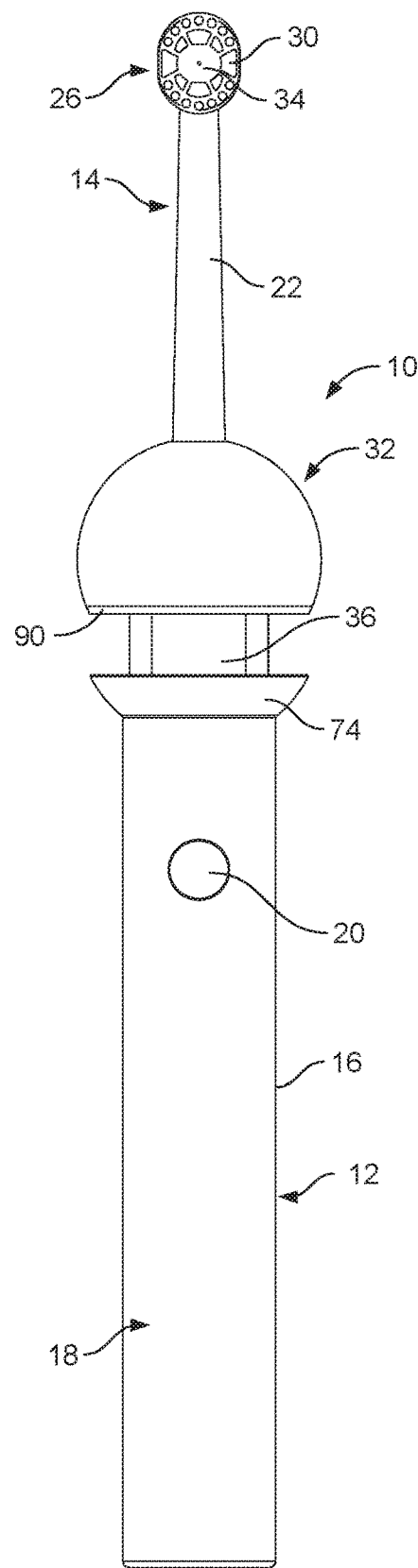
FIG. 8 is a front view of the appliance of FIG. 7(a)
Figure 9A:
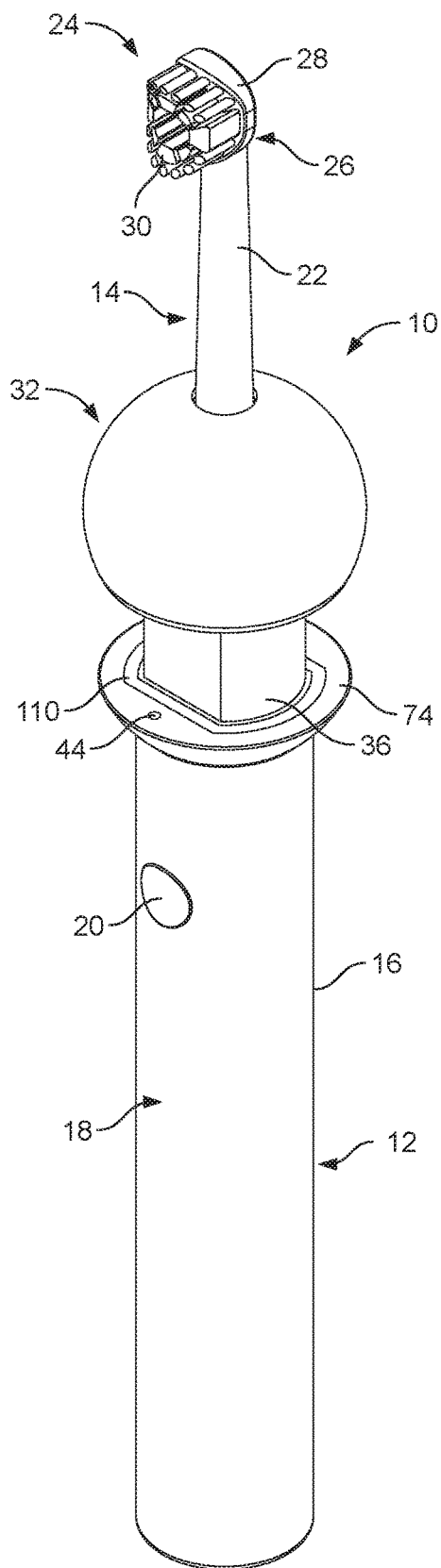
FIG. 9(a) is a perspective view, from the front, of the dental appliance with the fluid reservoir in second position.
Figure 9B:
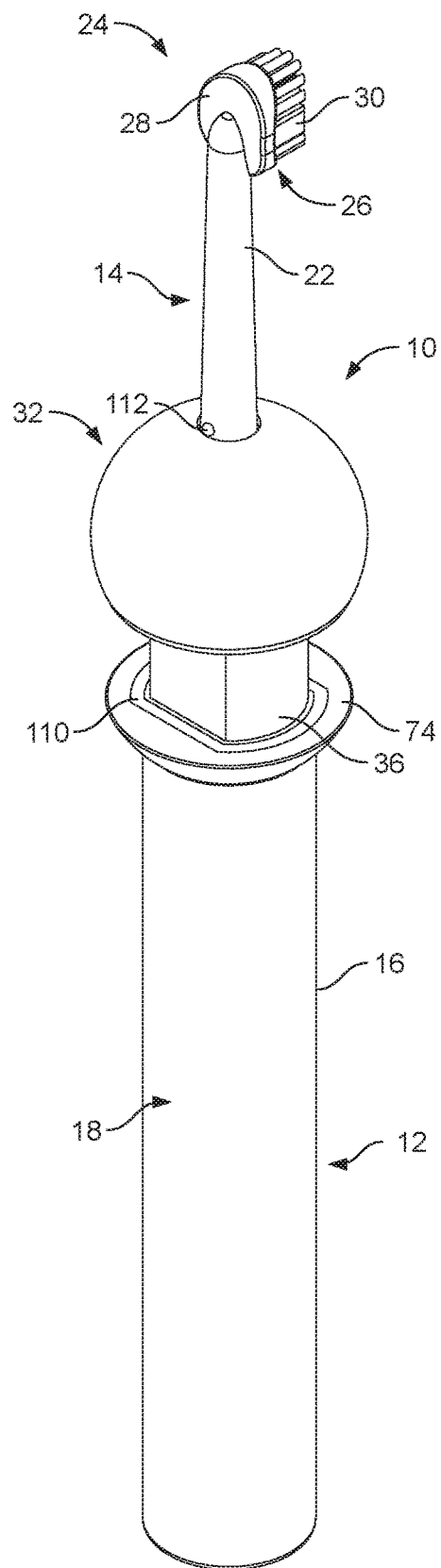
FIG. 9(b) is a perspective view, from the rear, of the dental cleaning appliance of FIG. 9(a)
Figure 10A:
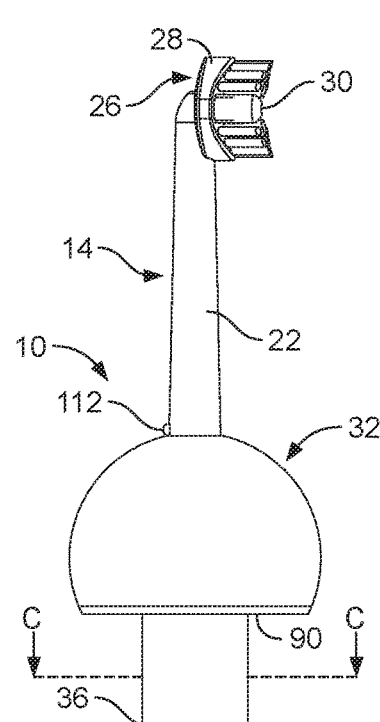
FIG. 10(a) is a right side view of the appliance of FIG. 9(a)
Figure 10B:
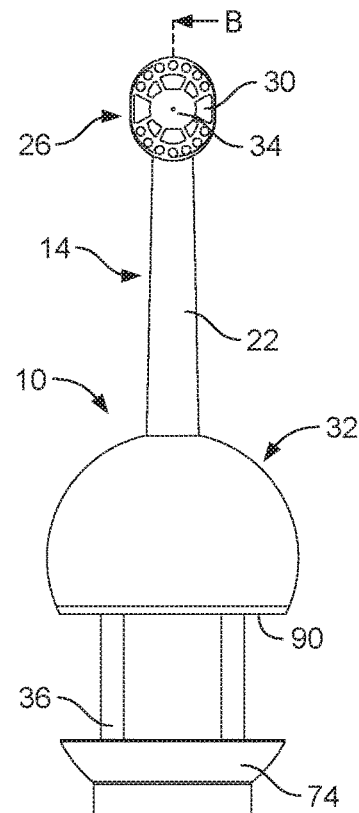
FIG. 10(b) is a front view of the appliance of FIG. 9(a) and FIG. 10(c) is a left side view of the appliance of FIG. 9(a)
Figure 10C:
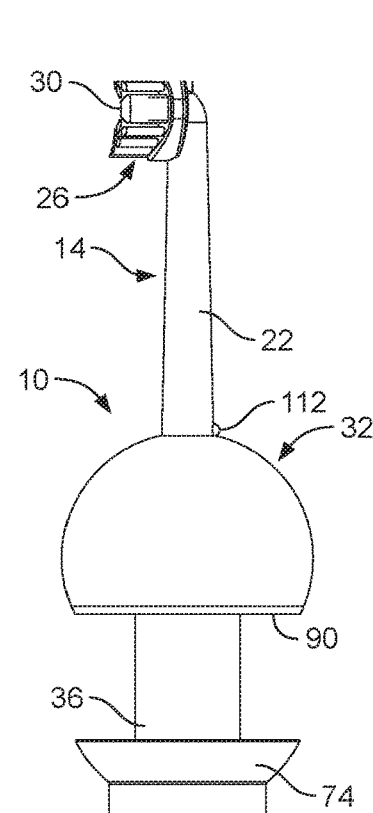

The fluid reservoir 32 does not have a dedicated fluid inlet through which the fluid reservoir 32 is replenished with working fluid. Instead, the fluid reservoir 32 is replenished through the fluid port 76. In view of this, the fluid reservoir 32 is moveable along the end portion 36 of the handle 12 between a first position, as illustrated in FIGS. 1(a) to 6, in which the fluid port 76 is connected to the fluid delivery system 40, and a second position, as illustrated in FIGS. 9(a) to 13, in which the fluid port 76 is exposed to allow the fluid reservoir 32 to be replenished. FIGS. 7 and 8 illustrate the fluid reservoir 32 intermediate the first position and the second position.

In this embodiment, the fluid reservoir 32 is slidable along the end section 36 of the handle 12 as it moves between the first position and the second position. Rotation of the fluid reservoir 32 relative to the handle 12 is inhibited through the use of non-circular cross-sectional shapes for the external surface of the end section 36 of the handle 12 and the internal surface of the inner wall 92 of the fluid reservoir 32. This maintains the angular alignment of the fluid port 76 and the fluid inlet 44, and so ensures that the fluid reservoir 32 becomes reconnected to the fluid delivery system 40 when it is returned to its first position.

To reduce the risk of the fluid reservoir 32 becoming accidentally dislodged from its first position during use of the appliance 10, the appliance 10 is arranged to apply a biasing force to the fluid reservoir 32 which urges it towards its first position. In the embodiment, the fluid reservoir 32 is urged by a magnetic force towards its first position. With reference to FIG. 4, two permanent magnets 106, 108 of the same polarity are mounted on the base 90 of the fluid reservoir 32. These magnets 106, 108 are attracted to a loop 110 of ferromagnetic material which is located on the seat 74. The magnetic force of attraction between the magnets 106, 108 and the loop 100 is selected so as to reduce the risk of accidental dislodgement of the fluid reservoir 32 from its first position, whilst enabling a user to pull the fluid reservoir 32 away from its first position without damage when the fluid reservoir 32 requires replenishment.

Figure 11:
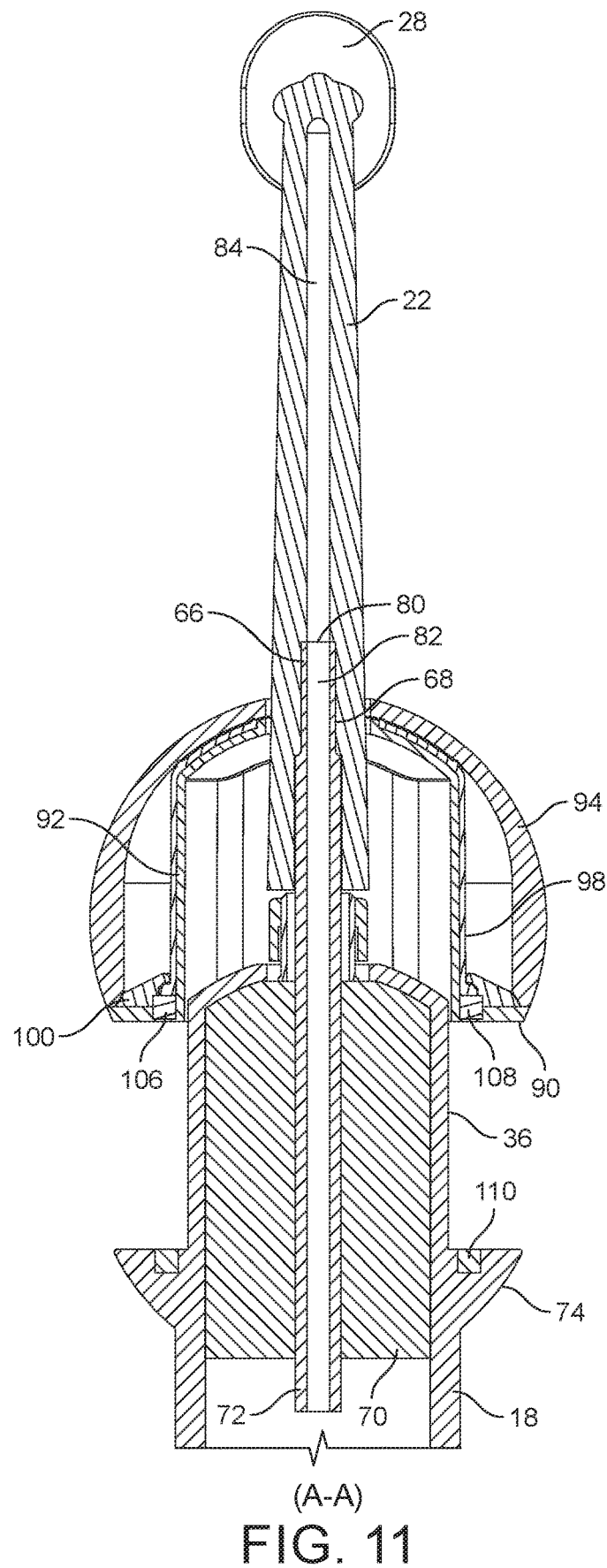
FIG. 11 is a sectional view along line A-A in FIG. 10(c)
Figure 12:
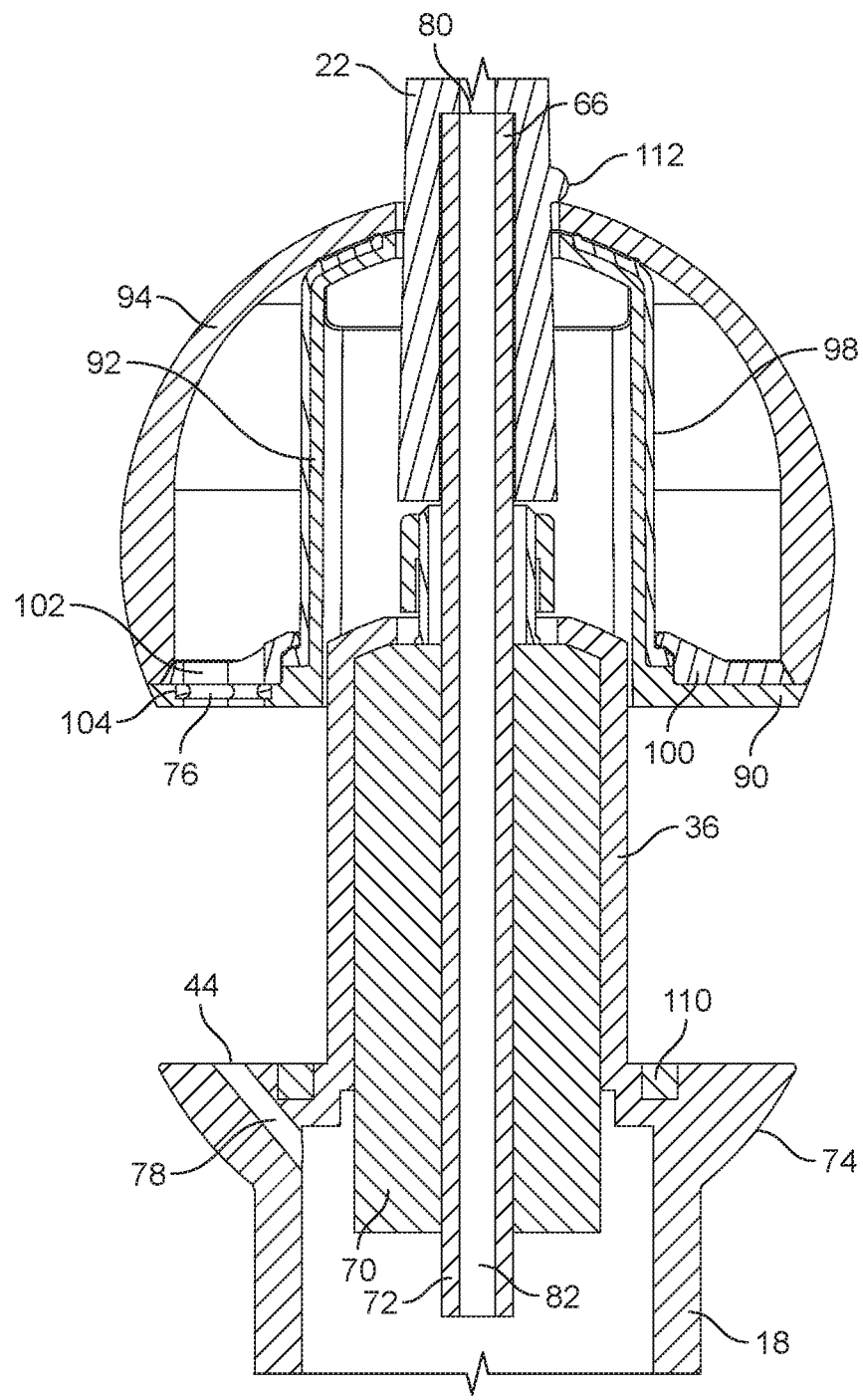
FIG. 12 is a sectional view along line B-B in FIG. 10(b)
Figure 13:
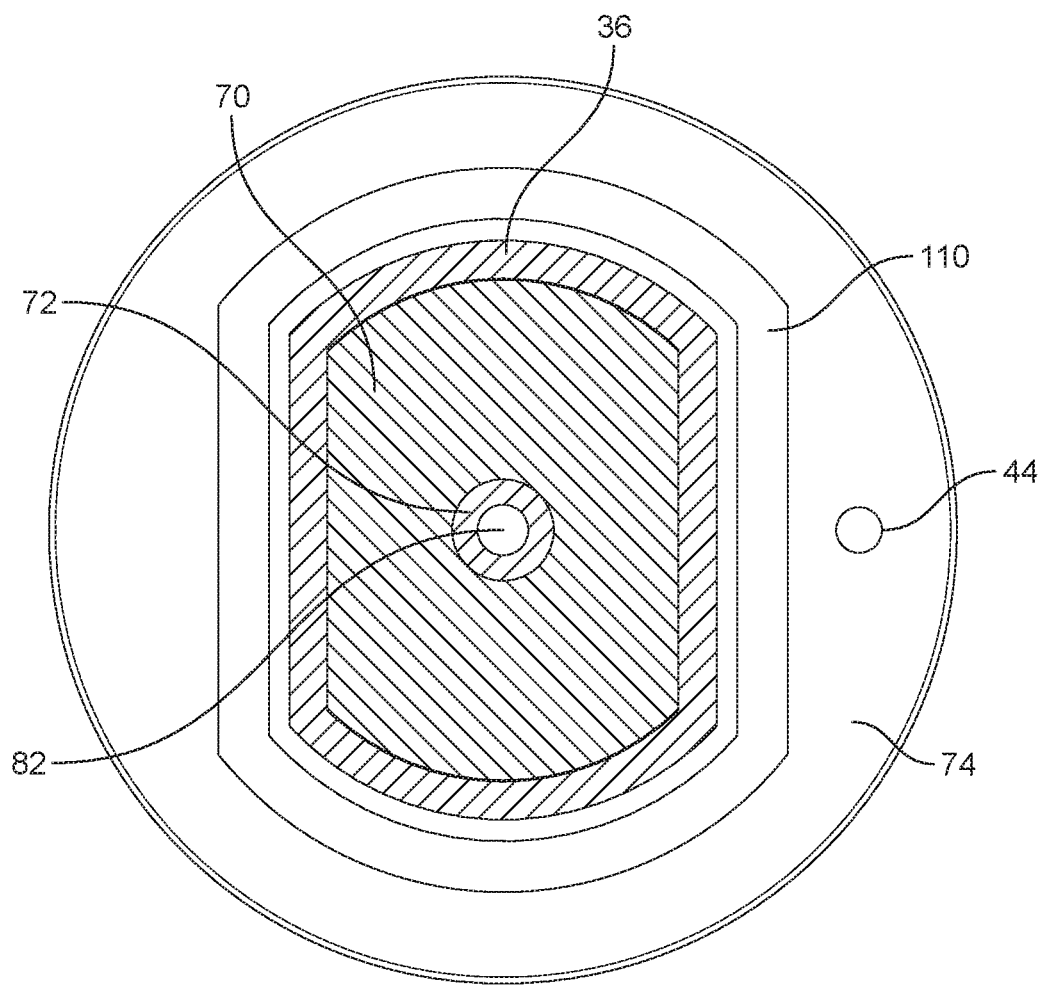
FIG. 13 is a sectional view along line C-C in FIG. 10(a).

As the fluid reservoir 32 moves towards its second position, the base 90 of the fluid reservoir 32 moves along the end portion 36 of the handle 12 towards the stem 22. As illustrated in FIGS. 11 and 12, when in its second position only the base 90 and the seal 100 of the fluid reservoir 32 still extend around the end portion 36 of the handle 12; a portion of the fluid reservoir 32 now extends around the stem 22. To prevent the fluid reservoir 32 from becoming fully detached from the handle 12 as it moves away from its first position, the appliance 10 includes a stop member 112 which engages the fluid reservoir 32 when in its second position to inhibit movement of the fluid reservoir 32 beyond its second position. The stop member 112 protrudes from the stem 22, and is arranged to engage the peripheral portion of the external wall 94 which defines the aperture 96 through which the shaft 72 passes.

To fill the fluid reservoir 32 with working fluid, which in this embodiment is water, the user inverts the appliance 10 from the orientation shown in FIGS. 1(a) to 2(c) and pulls the fluid reservoir 32 towards the head 24 of the appliance 10 so that the fluid reservoir 32 moves to its second position. The user may place the exposed fluid port 76 beneath the spout of a tap and turn on the tap so that water from the spout enters the fluid reservoir 32 through the fluid port 76. As the external wall 94 of the fluid reservoir 32 is transparent, the user can observe the filling of the fluid reservoir 32, and the contraction of the diaphragm 98 of the fluid reservoir 32 under the weight of the water within the fluid reservoir 32. As the fluid reservoir 32 becomes filled with water, air is expelled from the expansion chamber. When the fluid reservoir 32 is full, the user returns the fluid reservoir 32 to its first position, where it is retained by the magnetic force of attraction between the magnets 106, 108 and the loop 110. The user then returns the appliance 10 to the orientation shown in FIGS. 1(a) to 2(c) for use.

To operate the appliance 10, the user switches on the appliance 10 by depressing button 20, the action of which is detected by the control circuit 64. The control circuit 64 activates the drive motor 70 to move the brush unit 26 relative to the handle 12. When the button 20 is pressed again, a burst of water is emitted from the nozzle 34. The control circuit 64 activates the pump 46 to urge a volume of water from a fluid chamber of the pump 46 to the nozzle 34, and to replenish the fluid chamber through drawing a volume of water from the fluid reservoir 32. This continues until the user switches off the appliance 10 using the button 20, or until the fluid reservoir 32 has become depleted.

To replace the fluid reservoir 32, the user first pulls the stem 22 from the spigot 66. The user may then slide the fluid reservoir 32 from the end section 36 of the handle 12.

The invention claimed is:

1. A dental cleaning appliance comprising:
   a handle;
   a fluid reservoir for storing a working fluid, the fluid reservoir comprising a fluid port through which the fluid reservoir is replenished; and
   a fluid delivery system for receiving working fluid from the reservoir, the fluid delivery system comprising a nozzle for delivering working fluid to the oral cavity of a user;
   wherein the fluid reservoir is moveable along the handle between a first position in which the fluid port is connected to the fluid delivery system, and a second position in which the fluid port is exposed to allow the fluid reservoir to be replenished, the fluid reservoir moving towards the nozzle as it moves from the first position towards the second position.

2. The appliance of claim 1, wherein the fluid reservoir is slidable along the handle.

3. The appliance of claim 1, wherein the fluid reservoir extends around the handle.

4. The appliance of claim 1, wherein the handle comprises a first section which is gripped by a user during use of the appliance, and a second section which is spaced from the first section, and wherein the fluid reservoir moves along the second section of the handle.

5. The appliance of claim 4, wherein the second section of the handle is located proximate to an end of the handle.

6. The appliance of claim 5, wherein the second section of the handle defines, at least in part, the end of the handle.

7. The appliance of claim 4, wherein, in its first position, the fluid reservoir encloses the second section of the handle.

8. The appliance of claim 4, wherein the second section of the handle has a reduced cross-section relative to the first section of the handle.

9. The appliance of claim 4, wherein the second section of the handle comprises a tubular external surface, and the fluid reservoir comprises a tubular internal surface which surrounds the external surface of the second section of the handle when the fluid reservoir is in its first position.

10. The appliance of claim 9, wherein the tubular external surface of the second section of the handle has substantially the same shape as the tubular internal surface of the fluid reservoir.

11. The appliance of claim 9, wherein each of the tubular external surface of the second section of the handle and the tubular internal surface of the fluid reservoir has a non-circular cross-section.

12. The appliance of claim 4, wherein the handle comprises a seat for receiving the fluid reservoir when in its first position, and wherein the seat is located between the first section and the second section of the handle.

13. The appliance of claim 12, wherein the seat has a locally-enlarged cross-section compared to the first section of the handle.

14. The appliance of claim 13, wherein the seat is arranged perpendicular to a longitudinal axis of the handle.

15. The appliance of claim 14, wherein the seat is annular in shape.

16. The appliance of claim 1, wherein the fluid delivery system comprises a head and a stem extending between the head and the handle, and wherein, in its second position, at least part of the fluid reservoir extends about the stem.

17. The appliance of claim 16, wherein the stem is detachable from the handle.

\* \* \* \* \*